US 8,836,648 B2

(12) United States Patent
Wilairat

(10) Patent No.: US 8,836,648 B2
(45) Date of Patent: Sep. 16, 2014

(54) TOUCH PULL-IN GESTURE

(75) Inventor: Weerapan Wilairat, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 12/472,699

(22) Filed: May 27, 2009

(65) Prior Publication Data

US 2010/0302172 A1    Dec. 2, 2010

(51) Int. Cl.
  *G06F 3/041*    (2006.01)
  *G06F 3/0488*    (2013.01)
(52) U.S. Cl.
  CPC .................................. *G06F 3/04883* (2013.01)
  USPC ..................... 345/173; 178/18.01; 178/19.01; 715/810; 715/863
(58) Field of Classification Search
  USPC .......................... 345/173–178; 715/700–866; 178/18.01–19.07
  See application file for complete search history.

(56) References Cited

U.S. PATENT DOCUMENTS

| | | |
|---|---|---|
| 4,686,332 A | 8/1987 | Greanias et al. |
| 4,823,283 A | 4/1989 | Diehm et al. |
| 4,843,538 A | 6/1989 | Lane et al. |
| 5,045,997 A | 9/1991 | Watanabe |
| 5,046,001 A | 9/1991 | Barker et al. |
| 5,189,732 A | 2/1993 | Kondo |
| 5,231,578 A | 7/1993 | Levin et al. |
| 5,237,647 A | 8/1993 | Roberts et al. |
| 5,258,748 A | 11/1993 | Jones |
| 5,297,032 A | 3/1994 | Trojan et al. |
| 5,321,750 A | 6/1994 | Nadan |
| 5,339,392 A | 8/1994 | Risberg et al. |
| 5,351,995 A | 10/1994 | Booker et al. |
| 5,432,932 A | 7/1995 | Chen et al. |
| 5,463,725 A | 10/1995 | Henckel et al. |
| 5,485,197 A | 1/1996 | Hoarty |
| 5,491,783 A | 2/1996 | Douglas et al. |
| 5,497,776 A | 3/1996 | Yamazaki et al. |
| 5,511,148 A | 4/1996 | Wellner |
| 5,515,495 A | 5/1996 | Ikemoto |

(Continued)

FOREIGN PATENT DOCUMENTS

| | | |
|---|---|---|
| CN | 1326564 | 12/2001 |
| CN | 1766824 | 5/2006 |

(Continued)

OTHER PUBLICATIONS

Nordgren, Peder, "Development of a Touch Screen Interface for Scania Interactor", Retrieved at <<http://www.cs.umu.se/education/examina/Rapporter/PederNordgren.pdf>>, Apr. 10, 2007, pp. 67.

(Continued)

*Primary Examiner* — Michael Pervan
(74) *Attorney, Agent, or Firm* — Sung Kim; Andrew Sanders; Micky Minhas

(57) ABSTRACT

Embodiments of a touch pull-in gesture are described. In various embodiments, a touch input is detected that starts at an edge of a touch-screen and progresses as an expanding contact region from the edge of the touch-screen toward approximately a center region of the touch-screen while the touch input remains in contact with the touch-screen. The expanding contact region is determined as a touch pull-in gesture to initiate a display of a user interface component.

20 Claims, 4 Drawing Sheets

(56) References Cited

U.S. PATENT DOCUMENTS

| | | |
|---|---|---|
| 5,555,369 A | 9/1996 | Menendez et al. |
| 5,574,836 A | 11/1996 | Broemmelsiek |
| 5,596,697 A | 1/1997 | Foster et al. |
| 5,598,523 A | 1/1997 | Fujita |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,661,773 A | 8/1997 | Swerdloff et al. |
| 5,664,128 A | 9/1997 | Bauer |
| 5,675,329 A | 10/1997 | Barker |
| 5,687,331 A | 11/1997 | Volk et al. |
| 5,694,150 A | 12/1997 | Sigona et al. |
| 5,712,995 A | 1/1998 | Cohn |
| 5,731,813 A | 3/1998 | O'Rourke et al. |
| 5,761,485 A | 6/1998 | Munyan |
| 5,771,042 A | 6/1998 | Santos-Gomez |
| 5,793,415 A | 8/1998 | Gregory et al. |
| 5,817,019 A | 10/1998 | Kawashima |
| 5,819,284 A | 10/1998 | Farber et al. |
| 5,821,930 A * | 10/1998 | Hansen ............ 715/702 |
| 5,838,889 A | 11/1998 | Booker et al. |
| 5,860,073 A | 1/1999 | Ferrel et al. |
| 5,898,434 A | 4/1999 | Small et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 5,969,720 A | 10/1999 | Lisle et al. |
| 6,008,809 A | 12/1999 | Brooks |
| 6,008,816 A | 12/1999 | Eisler |
| 6,009,519 A | 12/1999 | Jones et al. |
| 6,028,600 A | 2/2000 | Rosin et al. |
| 6,029,214 A | 2/2000 | Dorfman et al. |
| 6,037,937 A | 3/2000 | Beaton et al. |
| 6,057,839 A | 5/2000 | Advani et al. |
| 6,061,061 A | 5/2000 | Conrad et al. |
| 6,064,383 A | 5/2000 | Skelly |
| 6,072,476 A | 6/2000 | Harada et al. |
| 6,097,392 A | 8/2000 | Leyerle |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,115,724 A | 9/2000 | Booker et al. |
| 6,166,736 A | 12/2000 | Hugh |
| 6,167,439 A | 12/2000 | Levine et al. |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,239,798 B1 | 5/2001 | Ludolph et al. |
| 6,266,098 B1 | 7/2001 | Cove et al. |
| 6,278,448 B1 | 8/2001 | Brown et al. |
| 6,310,610 B1 | 10/2001 | Beaton et al. |
| 6,311,058 B1 | 10/2001 | Wecker et al. |
| 6,340,979 B1 | 1/2002 | Beaton et al. |
| 6,369,837 B1 | 4/2002 | Schirmer |
| 6,385,630 B1 | 5/2002 | Ejerhed |
| 6,396,523 B1 | 5/2002 | Segal et al. |
| 6,396,963 B2 | 5/2002 | Shaffer et al. |
| 6,411,307 B1 | 6/2002 | Rosin et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,505,243 B1 | 1/2003 | Lortz |
| 6,507,352 B1 | 1/2003 | Cohen et al. |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,525,749 B1 | 2/2003 | Moran et al. |
| 6,538,635 B1 | 3/2003 | Ringot |
| 6,545,669 B1 | 4/2003 | Kinawi et al. |
| 6,570,597 B1 | 5/2003 | Seki et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,662,023 B1 | 12/2003 | Helle |
| 6,697,825 B1 | 2/2004 | Underwood et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,784,925 B1 | 8/2004 | Tomat et al. |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,859,909 B1 | 2/2005 | Lerner et al. |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,619 B1 | 7/2005 | Milekic |
| 6,938,101 B2 | 8/2005 | Hayes et al. |
| 6,961,731 B2 | 11/2005 | Holbrook |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,023,427 B2 | 4/2006 | Kraus et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,053,887 B2 | 5/2006 | Kraus et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,262,775 B2 | 8/2007 | Calkins et al. |
| 7,280,097 B2 | 10/2007 | Chen |
| 7,283,620 B2 | 10/2007 | Adamczyk |
| 7,289,806 B2 | 10/2007 | Morris et al. |
| 7,295,191 B2 | 11/2007 | Kraus et al. |
| 7,296,184 B2 | 11/2007 | Derks et al. |
| 7,296,242 B2 | 11/2007 | Agata et al. |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,369,647 B2 | 5/2008 | Gao et al. |
| 7,376,907 B2 | 5/2008 | Santoro et al. |
| 7,386,807 B2 | 6/2008 | Cummins et al. |

(56) References Cited

U.S. PATENT DOCUMENTS

| | | |
|---|---|---|
| 7,388,578 B2 | 6/2008 | Tao |
| 7,403,191 B2 | 7/2008 | Sinclair |
| 7,408,538 B2 | 8/2008 | Hinckley et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,454,717 B2 | 11/2008 | Hinckley et al. |
| 7,461,151 B2 | 12/2008 | Colson et al. |
| 7,469,380 B2 | 12/2008 | Wessling et al. |
| 7,478,326 B2 | 1/2009 | Holecek et al. |
| 7,479,949 B2 | 1/2009 | Jobs et al. |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,506,269 B2 | 3/2009 | Lang |
| 7,512,966 B2 | 3/2009 | Lyons, Jr. et al. |
| 7,532,196 B2 | 5/2009 | Hinckley |
| 7,577,918 B2 | 8/2009 | Lindsay |
| 7,581,034 B2 | 8/2009 | Polivy et al. |
| 7,593,995 B1 | 9/2009 | He et al. |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,636,071 B2 | 12/2009 | O'Gorman |
| 7,640,518 B2 | 12/2009 | Forlines et al. |
| 7,653,883 B2 | 1/2010 | Hotelling et al. |
| 7,656,393 B2 | 2/2010 | King et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,676,767 B2 | 3/2010 | Hofmeister et al. |
| 7,702,683 B1 | 4/2010 | Kirshenbaum |
| 7,755,674 B2 | 7/2010 | Kaminaga |
| 7,760,187 B2 * | 7/2010 | Kennedy ................... 715/863 |
| 7,821,780 B2 | 10/2010 | Choy |
| 7,834,861 B2 | 11/2010 | Lee |
| D631,043 S | 1/2011 | Kell |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,924,271 B2 | 4/2011 | Christie et al. |
| 7,933,632 B2 | 4/2011 | Flynt et al. |
| 7,956,847 B2 | 6/2011 | Christie |
| 7,983,718 B1 | 7/2011 | Roka |
| 7,987,431 B2 | 7/2011 | Santoro et al. |
| 8,006,276 B2 | 8/2011 | Nakagawa et al. |
| 8,086,275 B2 | 12/2011 | Wykes et al. |
| 8,102,858 B1 | 1/2012 | Rahim et al. |
| 8,131,808 B2 | 3/2012 | Aoki et al. |
| 8,150,924 B2 | 4/2012 | Buchheit et al. |
| 8,175,653 B2 | 5/2012 | Smuga |
| 8,212,788 B2 | 7/2012 | Lam |
| 8,238,876 B2 | 8/2012 | Teng |
| 8,239,785 B2 | 8/2012 | Hinckley |
| 8,250,494 B2 | 8/2012 | Butcher |
| 8,255,473 B2 | 8/2012 | Eren et al. |
| 8,261,213 B2 | 9/2012 | Hinckley |
| 8,269,736 B2 | 9/2012 | Wilairat |
| 8,289,289 B2 | 10/2012 | Rimon et al. |
| 8,294,669 B2 | 10/2012 | Partridge et al. |
| 8,327,295 B2 | 12/2012 | Ikeda et al. |
| 8,373,660 B2 | 2/2013 | Pallakoff |
| 8,473,870 B2 | 6/2013 | Hinckley et al. |
| 8,587,526 B2 | 11/2013 | Engelhardt et al. |
| 8,589,815 B2 | 11/2013 | Fong et al. |
| 8,612,874 B2 | 12/2013 | Zaman et al. |
| 8,707,174 B2 | 4/2014 | Hinckley et al. |
| 8,751,970 B2 | 6/2014 | Hinckley et al. |
| 8,799,827 | 8/2014 | Hinckley et al. |
| 2001/0012000 A1 | 8/2001 | Eberhard |
| 2001/0022621 A1 | 9/2001 | Squibbs |
| 2001/0035860 A1 | 11/2001 | Segal et al. |
| 2001/0047263 A1 | 11/2001 | Smith et al. |
| 2002/0000963 A1 | 1/2002 | Yoshida et al. |
| 2002/0018051 A1 | 2/2002 | Singh |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097229 A1 | 7/2002 | Rose et al. |
| 2002/0097264 A1 | 7/2002 | Dutta et al. |
| 2002/0101457 A1 | 8/2002 | Lang |
| 2002/0115476 A1 | 8/2002 | Padawer et al. |
| 2002/0116421 A1 | 8/2002 | Fox et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0098858 A1 | 5/2003 | Perski et al. |
| 2003/0105827 A1 | 6/2003 | Tan et al. |
| 2003/0135582 A1 | 7/2003 | Allen et al. |
| 2003/0179541 A1 | 9/2003 | Sullivan |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0231219 A1 | 12/2003 | Leung |
| 2004/0001048 A1 | 1/2004 | Kraus et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0155871 A1 | 8/2004 | Perski et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0236774 A1 | 11/2004 | Baird et al. |
| 2004/0237048 A1 | 11/2004 | Tojo et al. |
| 2004/0250217 A1 | 12/2004 | Tojo et al. |
| 2004/0255254 A1 | 12/2004 | Weingart et al. |
| 2005/0005241 A1 | 1/2005 | Hunleth et al. |
| 2005/0012723 A1 | 1/2005 | Pallakoff |
| 2005/0017959 A1 | 1/2005 | Kraus et al. |
| 2005/0028208 A1 | 2/2005 | Ellis |
| 2005/0044058 A1 | 2/2005 | Matthews et al. |
| 2005/0052432 A1 | 3/2005 | Kraus et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0101864 A1 | 5/2005 | Zheng et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0129314 A1 | 6/2005 | Chen |
| 2005/0143138 A1 | 6/2005 | Lee et al. |
| 2005/0182798 A1 | 8/2005 | Todd et al. |
| 2005/0183021 A1 | 8/2005 | Allen et al. |
| 2005/0184973 A1 | 8/2005 | Lum et al. |
| 2005/0184999 A1 | 8/2005 | Daioku |
| 2005/0189154 A1 | 9/2005 | Perski et al. |

(56) References Cited

U.S. PATENT DOCUMENTS

| | | |
|---|---|---|
| 2005/0198159 A1 | 9/2005 | Kirsch |
| 2005/0198584 A1 | 9/2005 | Matthews et al. |
| 2005/0198592 A1 | 9/2005 | Keely, Jr. et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0001650 A1 | 1/2006 | Robbins et al. |
| 2006/0004685 A1 | 1/2006 | Pyhalammi et al. |
| 2006/0010371 A1 | 1/2006 | Shur et al. |
| 2006/0010394 A1 | 1/2006 | Chaudhri et al. |
| 2006/0012580 A1 | 1/2006 | Perski et al. |
| 2006/0012581 A1 | 1/2006 | Haim et al. |
| 2006/0015736 A1 | 1/2006 | Callas et al. |
| 2006/0015812 A1 | 1/2006 | Cunningham |
| 2006/0022955 A1 | 2/2006 | Kennedy |
| 2006/0026013 A1 | 2/2006 | Kraft |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031786 A1 | 2/2006 | Hillis et al. |
| 2006/0036425 A1 | 2/2006 | Le Cocq et al. |
| 2006/0059430 A1 | 3/2006 | Bells |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0092177 A1 | 5/2006 | Blasko |
| 2006/0093219 A1 | 5/2006 | Gounares et al. |
| 2006/0101354 A1 | 5/2006 | Hashimoto et al. |
| 2006/0103623 A1 | 5/2006 | Davis |
| 2006/0107231 A1 | 5/2006 | Matthews et al. |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0161870 A1 | 7/2006 | Hotelling et al. |
| 2006/0172724 A1 | 8/2006 | Linkert et al. |
| 2006/0173911 A1 | 8/2006 | Levin et al. |
| 2006/0190833 A1 | 8/2006 | SanGiovanni et al. |
| 2006/0197750 A1 | 9/2006 | Kerr et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0238517 A1 | 10/2006 | King et al. |
| 2006/0238520 A1 | 10/2006 | Westerman et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0262188 A1 | 11/2006 | Elyada et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0073718 A1 | 3/2007 | Ramer |
| 2007/0075976 A1 | 4/2007 | Kun et al. |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083821 A1 | 4/2007 | Garbow et al. |
| 2007/0097096 A1 | 5/2007 | Rosenberg |
| 2007/0106635 A1 | 5/2007 | Frieden et al. |
| 2007/0106939 A1 | 5/2007 | Qassoudi |
| 2007/0109274 A1 | 5/2007 | Reynolds |
| 2007/0120762 A1 | 5/2007 | O'Gorman |
| 2007/0127638 A1 | 6/2007 | Doulton |
| 2007/0146347 A1 | 6/2007 | Rosenberg |
| 2007/0150496 A1 | 6/2007 | Feinsmith |
| 2007/0157089 A1 | 7/2007 | Van Os et al. |
| 2007/0168890 A1 | 7/2007 | Zhao et al. |
| 2007/0171192 A1 | 7/2007 | Seo et al. |
| 2007/0171211 A1 | 7/2007 | Perski et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0225022 A1 | 9/2007 | Satake |
| 2007/0233654 A1 | 10/2007 | Karlson |
| 2007/0236468 A1* | 10/2007 | Tuli ............................... 345/173 |
| 2007/0238488 A1 | 10/2007 | Scott |
| 2007/0242056 A1 | 10/2007 | Engelhardt et al. |
| 2007/0247435 A1 | 10/2007 | Benko et al. |
| 2007/0250583 A1 | 10/2007 | Hardy |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0001924 A1* | 1/2008 | de los Reyes et al. ........ 345/173 |
| 2008/0005668 A1 | 1/2008 | Mavinkurve |
| 2008/0005703 A1 | 1/2008 | Radivojevic et al. |
| 2008/0028294 A1 | 1/2008 | Sell et al. |
| 2008/0032681 A1 | 2/2008 | West |
| 2008/0036743 A1 | 2/2008 | Westerman et al. |
| 2008/0040692 A1 | 2/2008 | Sunday et al. |
| 2008/0042978 A1 | 2/2008 | Perez-Noguera |
| 2008/0046425 A1 | 2/2008 | Perski |
| 2008/0048986 A1 | 2/2008 | Khoo |
| 2008/0052370 A1 | 2/2008 | Snyder |
| 2008/0052945 A1* | 3/2008 | Matas et al. .................... 34/173 |
| 2008/0057910 A1 | 3/2008 | Thoresson et al. |
| 2008/0057926 A1 | 3/2008 | Forstall et al. |
| 2008/0062141 A1 | 3/2008 | Chandhri |
| 2008/0065720 A1 | 3/2008 | Brodersen et al. |
| 2008/0072173 A1 | 3/2008 | Brunner et al. |
| 2008/0076472 A1 | 3/2008 | Hyatt |
| 2008/0082903 A1 | 4/2008 | McCurdy et al. |
| 2008/0082934 A1 | 4/2008 | Kocienda et al. |
| 2008/0084400 A1 | 4/2008 | Rosenberg |
| 2008/0085700 A1 | 4/2008 | Arora |
| 2008/0092054 A1 | 4/2008 | Bhumkar et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |

(56) References Cited

U.S. PATENT DOCUMENTS

| | | |
|---|---|---|
| 2008/0114535 A1 | 5/2008 | Nesbitt |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0164982 A1 | 7/2008 | Andrews et al. |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0165255 A1 | 7/2008 | Christie et al. |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168396 A1 | 7/2008 | Matas et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0208973 A1 | 8/2008 | Hayashi |
| 2008/0211766 A1 | 9/2008 | Westerman et al. |
| 2008/0211778 A1 | 9/2008 | Ording et al. |
| 2008/0218494 A1 | 9/2008 | Perski et al. |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0229192 A1 | 9/2008 | Gear et al. |
| 2008/0242362 A1 | 10/2008 | Duarte |
| 2008/0249682 A1 | 10/2008 | Wisniewski et al. |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0278455 A1 | 11/2008 | Atkins et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0303798 A1 | 12/2008 | Matsudate et al. |
| 2008/0307351 A1 | 12/2008 | Louch et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031247 A1 | 1/2009 | Walter et al. |
| 2009/0033632 A1 | 2/2009 | Szolyga et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0054107 A1 | 2/2009 | Feland, III et al. |
| 2009/0058830 A1 | 3/2009 | Herz et al. |
| 2009/0059730 A1 | 3/2009 | Lyons et al. |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077501 A1 | 3/2009 | Partridge et al. |
| 2009/0077649 A1 | 3/2009 | Lockhart |
| 2009/0079699 A1 | 3/2009 | Sun |
| 2009/0083656 A1 | 3/2009 | Dokhon |
| 2009/0085851 A1 | 4/2009 | Lim |
| 2009/0085878 A1 | 4/2009 | Heubel |
| 2009/0089215 A1 | 4/2009 | Newton |
| 2009/0094562 A1 | 4/2009 | Jeong et al. |
| 2009/0096758 A1 | 4/2009 | Hotelling et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0117943 A1 | 5/2009 | Lee et al. |
| 2009/0128505 A1 | 5/2009 | Partridge et al. |
| 2009/0138830 A1 | 5/2009 | Borgaonkar et al. |
| 2009/0140061 A1 | 6/2009 | Schultz et al. |
| 2009/0140986 A1 | 6/2009 | Karkkainen et al. |
| 2009/0143141 A1 | 6/2009 | Wells et al. |
| 2009/0144653 A1 | 6/2009 | Ubillos |
| 2009/0146962 A1 | 6/2009 | Ahonen et al. |
| 2009/0153289 A1 | 6/2009 | Hope et al. |
| 2009/0153438 A1 | 6/2009 | Miller et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0167696 A1 | 7/2009 | Griffin |
| 2009/0167702 A1 | 7/2009 | Nurmi |
| 2009/0182788 A1 | 7/2009 | Chung et al. |
| 2009/0193366 A1 | 7/2009 | Davidson |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0249236 A1 | 10/2009 | Westerman et al. |
| 2009/0251432 A1 | 10/2009 | Wang et al. |
| 2009/0251434 A1 | 10/2009 | Rimon et al. |
| 2009/0265662 A1 | 10/2009 | Bamford |
| 2009/0271778 A1 | 10/2009 | Mandyam et al. |
| 2009/0276701 A1 | 11/2009 | Nurmi |
| 2009/0282332 A1 | 11/2009 | Porat |
| 2009/0284478 A1 | 11/2009 | De la Torre Baltierra |
| 2009/0284482 A1 | 11/2009 | Chin |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0295753 A1 | 12/2009 | King et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0309846 A1 | 12/2009 | Trachtenberg et al. |
| 2009/0313584 A1 | 12/2009 | Kerr et al. |
| 2009/0315847 A1 | 12/2009 | Fujii |
| 2009/0320070 A1 | 12/2009 | Inoguchi |
| 2009/0322760 A1 | 12/2009 | Kwiatkowski et al. |
| 2009/0327975 A1 | 12/2009 | Stedman |
| 2010/0008490 A1 | 1/2010 | Gharachorloo et al. |
| 2010/0013768 A1 | 1/2010 | Leung |
| 2010/0013782 A1 | 1/2010 | Liu et al. |
| 2010/0016049 A1 | 1/2010 | Shirakawa et al. |
| 2010/0020025 A1 | 1/2010 | Lemort et al. |
| 2010/0031186 A1 | 2/2010 | Tseng |
| 2010/0042911 A1 | 2/2010 | Wormald et al. |
| 2010/0045705 A1 | 2/2010 | Vertegaal et al. |
| 2010/0050076 A1 | 2/2010 | Roth |
| 2010/0053861 A1 | 3/2010 | Kim et al. |
| 2010/0058182 A1 | 3/2010 | Jung |
| 2010/0066667 A1 | 3/2010 | MacDougall et al. |
| 2010/0066698 A1 | 3/2010 | Seo |
| 2010/0070931 A1 | 3/2010 | Nichols |
| 2010/0073380 A1 | 3/2010 | Kaplan et al. |

(56) References Cited

U.S. PATENT DOCUMENTS

| | | |
|---|---|---|
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0083154 A1 | 4/2010 | Takeshita |
| 2010/0083190 A1 | 4/2010 | Roberts et al. |
| 2010/0088635 A1 | 4/2010 | Louch |
| 2010/0088641 A1 | 4/2010 | Choi |
| 2010/0090971 A1 | 4/2010 | Choi et al. |
| 2010/0097338 A1 | 4/2010 | Miyashita et al. |
| 2010/0100839 A1 | 4/2010 | Tseng et al. |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0105443 A1 | 4/2010 | Vaisanen |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0115455 A1 | 5/2010 | Kim |
| 2010/0122110 A1 | 5/2010 | Ordogh |
| 2010/0134415 A1 | 6/2010 | Iwase et al. |
| 2010/0137027 A1 | 6/2010 | Kim |
| 2010/0138767 A1 | 6/2010 | Wang et al. |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0164878 A1 | 7/2010 | Bestle et al. |
| 2010/0164959 A1 | 7/2010 | Brown et al. |
| 2010/0167699 A1 | 7/2010 | Sigmund et al. |
| 2010/0169766 A1 | 7/2010 | Duarte et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0188371 A1 | 7/2010 | Lowles et al. |
| 2010/0201634 A1 | 8/2010 | Coddington |
| 2010/0213040 A1 | 8/2010 | Yeh et al. |
| 2010/0216491 A1 | 8/2010 | Winkler et al. |
| 2010/0217428 A1 | 8/2010 | Strong et al. |
| 2010/0241973 A1 | 9/2010 | Whiddett |
| 2010/0245263 A1 | 9/2010 | Parada, Jr. et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0251153 A1 | 9/2010 | SanGiovanni et al. |
| 2010/0251189 A1 | 9/2010 | Jaeger |
| 2010/0262928 A1 | 10/2010 | Abbott |
| 2010/0281409 A1 | 11/2010 | Rainisto et al. |
| 2010/0283743 A1 | 11/2010 | Coddington et al. |
| 2010/0283748 A1 | 11/2010 | Hsieh et al. |
| 2010/0293056 A1 | 11/2010 | Flynt et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0309148 A1 | 12/2010 | Fleizach et al. |
| 2010/0311470 A1 | 12/2010 | Seo et al. |
| 2010/0313124 A1 | 12/2010 | Privault et al. |
| 2010/0313165 A1 | 12/2010 | Louch et al. |
| 2010/0321403 A1 | 12/2010 | Inadome |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0018821 A1 | 1/2011 | Kii |
| 2011/0029598 A1 | 2/2011 | Arnold et al. |
| 2011/0029904 A1 | 2/2011 | Smith et al. |
| 2011/0029934 A1 | 2/2011 | Locker et al. |
| 2011/0043527 A1 | 2/2011 | Ording et al. |
| 2011/0050594 A1 | 3/2011 | Kim et al. |
| 2011/0055729 A1 | 3/2011 | Mason et al. |
| 2011/0055753 A1 | 3/2011 | Horodezky et al. |
| 2011/0055773 A1 | 3/2011 | Agarawala et al. |
| 2011/0074699 A1 | 3/2011 | Marr et al. |
| 2011/0074710 A1 | 3/2011 | Weeldreyer et al. |
| 2011/0078624 A1 | 3/2011 | Missig et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107220 A1 | 5/2011 | Perlman |
| 2011/0107272 A1 | 5/2011 | Aguilar |
| 2011/0115735 A1 | 5/2011 | Lev et al. |
| 2011/0119586 A1 | 5/2011 | Blinnikka et al. |
| 2011/0126094 A1 | 5/2011 | Horodezky et al. |
| 2011/0143769 A1 | 6/2011 | Jones et al. |
| 2011/0154235 A1 | 6/2011 | Min et al. |
| 2011/0167336 A1 | 7/2011 | Aitken et al. |
| 2011/0167341 A1 | 7/2011 | Cranfill et al. |
| 2011/0173556 A1 | 7/2011 | Czerwinski et al. |
| 2011/0173568 A1 | 7/2011 | Royal, Jr. et al. |
| 2011/0175930 A1 | 7/2011 | Hwang et al. |
| 2011/0179386 A1 | 7/2011 | Shaffer et al. |
| 2011/0179387 A1 | 7/2011 | Shaffer et al. |
| 2011/0181524 A1 | 7/2011 | Hinckley |
| 2011/0185299 A1 | 7/2011 | Hinckley |
| 2011/0185300 A1 | 7/2011 | Hinckley |
| 2011/0185318 A1 | 7/2011 | Hinckley et al. |
| 2011/0185320 A1 | 7/2011 | Hinckley |
| 2011/0191675 A1 | 8/2011 | Kauranen |
| 2011/0191704 A1 | 8/2011 | Hinckley |
| 2011/0191718 A1 | 8/2011 | Hinckley |
| 2011/0191719 A1 | 8/2011 | Hinckley |
| 2011/0199386 A1 | 8/2011 | Dharwada et al. |
| 2011/0205163 A1 | 8/2011 | Hinckley |
| 2011/0209039 A1 | 8/2011 | Hinckley |
| 2011/0209057 A1 | 8/2011 | Hinckley |
| 2011/0209058 A1 | 8/2011 | Hinckley |
| 2011/0209088 A1 | 8/2011 | Hinckley |
| 2011/0209089 A1 | 8/2011 | Hinckley |
| 2011/0209093 A1 | 8/2011 | Hinckley |
| 2011/0209097 A1 | 8/2011 | Hinckley |
| 2011/0209098 A1 | 8/2011 | Hinckley |
| 2011/0209099 A1 | 8/2011 | Hinckley |
| 2011/0209100 A1 | 8/2011 | Hinckley |
| 2011/0209101 A1 | 8/2011 | Hinckley |
| 2011/0209102 A1 | 8/2011 | Hinckley |
| 2011/0209103 A1 | 8/2011 | Hinckley |
| 2011/0209104 A1 | 8/2011 | Hinckley |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0252381 A1 | 10/2011 | Chaudhri |
| 2011/0291964 A1 | 12/2011 | Chambers et al. |
| 2012/0009903 A1 | 1/2012 | Schultz et al. |
| 2012/0028687 A1 | 2/2012 | Wykes |
| 2012/0050185 A1 | 3/2012 | Davydov et al. |
| 2012/0084705 A1 | 4/2012 | Lee et al. |
| 2012/0096411 A1 | 4/2012 | Nash |
| 2012/0102433 A1 | 4/2012 | Falkenburg |
| 2012/0151397 A1 | 6/2012 | Oberstein et al. |
| 2012/0159395 A1 | 6/2012 | Deutsch et al. |
| 2012/0167008 A1 | 6/2012 | Zaman |
| 2012/0167011 A1 | 6/2012 | Zaman |
| 2012/0174005 A1 | 7/2012 | Deutsch |
| 2012/0174029 A1 | 7/2012 | Bastide et al. |
| 2012/0179992 A1 | 7/2012 | Smuga |
| 2012/0180001 A1 | 7/2012 | Griffin et al. |
| 2012/0210265 A1 | 8/2012 | Delia et al. |
| 2012/0212495 A1 | 8/2012 | Butcher |
| 2012/0233571 A1 | 9/2012 | Wever et al. |
| 2012/0236026 A1 | 9/2012 | Hinckley |
| 2012/0244841 A1 | 9/2012 | Teng |

(56) References Cited

U.S. PATENT DOCUMENTS

| | | |
|---|---|---|
| 2012/0254780 A1 | 10/2012 | Mouton et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304107 A1 | 11/2012 | Nan et al. |
| 2012/0304108 A1 | 11/2012 | Jarrett et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2013/0042203 A1 | 2/2013 | Wong et al. |
| 2013/0047079 A1 | 2/2013 | Kroeger et al. |
| 2013/0047105 A1 | 2/2013 | Jarrett |
| 2013/0047126 A1 | 2/2013 | Sareen |
| 2013/0057587 A1 | 3/2013 | Leonard et al. |
| 2013/0063442 A1 | 3/2013 | Zaman |
| 2013/0063465 A1 | 3/2013 | Zaman |
| 2013/0067412 A1 | 3/2013 | Leonard |

FOREIGN PATENT DOCUMENTS

| | | |
|---|---|---|
| CN | 101432677 | 5/2009 |
| CN | 201298220 | 8/2009 |
| CN | 101566865 | 10/2009 |
| CN | 101576789 | 11/2009 |
| CN | 101627361 | 1/2010 |
| CN | 101636711 | 1/2010 |
| CN | 102197702 | 9/2011 |
| EP | 0583060 | 2/1994 |
| EP | 1752868 | 2/2007 |
| EP | 1942401 | 7/2008 |
| EP | 2148268 | 1/2010 |
| JP | 6282368 | 10/1994 |
| JP | 7281810 | 10/1995 |
| JP | 2001265523 | 9/2001 |
| JP | 2001290585 | 10/2001 |
| JP | 2004227393 | 8/2004 |
| JP | 2004357257 | 12/2004 |
| JP | 2008305087 | 12/2008 |
| JP | 2009097724 | 4/2009 |
| JP | 2010250465 | 11/2010 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 20090013927 | 2/2009 |
| KR | 1020090041635 | 4/2009 |
| KR | 1020090088501 | 8/2009 |
| KR | 20090106755 | 10/2009 |
| KR | 20100010072 | 2/2010 |
| KR | 20100048375 | 5/2010 |
| KR | 20100056369 | 5/2010 |
| KR | 1020100056369 | 5/2010 |
| TW | 200947297 | 11/2009 |
| TW | 201023026 | 6/2010 |
| WO | WO-9928812 | 1/1999 |
| WO | WO-9926127 | 5/1999 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2009000043 | 12/2008 |
| WO | WO-2009012398 | 1/2009 |
| WO | WO-2009049331 | 4/2009 |
| WO | WO-2009086628 | 7/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010135155 | 11/2010 |
| WO | WO-2011041885 | 4/2011 |
| WO | WO-2011106467 | 9/2011 |
| WO | WO-2011106468 | 9/2011 |

OTHER PUBLICATIONS

Vallerio, et al., "Energy-Efficient Graphical User Interface Design", Retrieved at <<http://www.cc.gatech.edu/classes/AY2007/cs7470_fall/zhong-energy-efficient-user-interface.pdf>>, pp. 1-13.

"UI Guidelines", Retrieved at <<http://na.blackberry.com/eng/deliverables/6622/BlackBerry_Smartphones-US.pdf>>, Blackberry SmartPhones, pp. 76.

"Apple Unibody MacBook Pro #MB991LL/A 2.53 GHz Intel Core 2 Duo", Retrieved from: <http://www.themacstore.com/parts/show/c-nmb3-mb991ll_a> on Nov. 10, 2009, 12 pages.

"Dell and Windows 7—The Wait Is Over", Retrieved from: <http://content.dell.com/us/en/corp/d/press-releases/2009-10-22-Dell-and-Windows-7.aspx> on Nov. 10, 2009, (Oct. 22, 2009), 2 pages.

"Final Office Action", U.S. Appl. No. 12/695,937, (Jul. 26, 2012), 13 pages.

"Final Office Action", U.S. Appl. No. 12/695,976, (Nov. 21, 2012), 10 pages.

"Final Office Action", U.S. Appl. No. 12/700,357, (Oct. 24, 2012), 13 pages.

"Final Office Action", U.S. Appl. No. 12/700,460, (Aug. 28, 2012), 26 pages.

"Final Office Action", U.S. Appl. No. 12/700,510, (Oct. 10, 2012), 23 pages.

"Final Office Action", U.S. Appl. No. 12/709,204, (Oct. 3, 2012), 24 pages.

"Final Office Action", U.S. Appl. No. 12/709,245, (Mar. 15, 2013), 16 pages.

"Final Office Action", U.S. Appl. No. 12/709,245, (Jan. 6, 2012), 13 pages.

"Final Office Action", U.S. Appl. No. 12/709,282, (Dec. 24, 2012), 11 pages.

"Final Office Action", U.S. Appl. No. 12/709,301, (Jan. 7, 2013), 14 pages.

"Final Office Action", U.S. Appl. No. 12/709,301, (Mar. 1, 2012), 11 pages.

"Final Office Action", U.S. Appl. No. 12/709,348, (Jan. 7, 2013), 15 pages.

"Final Office Action", U.S. Appl. No. 12/709,348, (Feb. 17, 2012), 13 pages.

"Final Office Action", U.S. Appl. No. 12/709,376, (Nov. 8, 2012), 20 pages.

"Final Office Action", U.S. Appl. No. 12/709,376, (Mar. 30, 2012), 16 pages.

"Final Office Action", U.S. Appl. No. 12/713,053, (Aug. 17, 2012), 10 pages.

"Final Office Action", U.S. Appl. No. 12/713,081, (May 9, 2012), 19 pages.

"Final Office Action", U.S. Appl. No. 12/713,096, (Feb. 15, 2013), 7 pages.

"Final Office Action", U.S. Appl. No. 12/713,110, (Jan. 17, 2013), 10 pages.

"Final Office Action", U.S. Appl. No. 12/713,113, (Jun. 4, 2012), 18 pages.

"Final Office Action", U.S. Appl. No. 12/713,118, (Oct. 26, 2012), 10 pages.

"Final Office Action", U.S. Appl. No. 12/713,127, (Jun. 6, 2012), 18 pages.

(56) References Cited

OTHER PUBLICATIONS

"Final Office Action", U.S. Appl. No. 12/713,130, (Jun. 29, 2012),8 pages.
"Final Office Action", U.S. Appl. No. 12/713,133, (May 20, 2013),10 pages.
"Final Office Action", U.S. Appl. No. 12/713,133, (Jul. 2, 2012),8 pages.
"Final Office Action", U.S. Appl. No. 13/484,075, (May 21, 2013),10 pages.
"Foreign Office Action", Chinese Application 201110044285.5, (Apr. 24, 2013),8 pages.
"Foreign Office Action", Chinese Application 201110044285.5, (Jun. 20, 2012),12 pages.
"Foreign Office Action", Chinese Application No. 201110044285.5, (Jan. 4, 2013),13 pages.
"Foreign Office Action", Chinese Application No. 201110046510.9, (May 31, 2013),11 pages.
"Foreign Office Action", Chinese Application No. 201110046519.X, (Aug. 2, 2012),13 pages.
"Foreign Office Action", Chinese Application No. 201110046519.X, (Mar. 19, 2013),12 pages.
"Foreign Office Action", Chinese Application No. 201110046529.3, (Aug. 16, 2012),14 pages.
"Foreign Office Action", Chinese Application No. 201110046529.3, (Feb. 4, 2013),9 pages.
"Foreign Office Action", Chinese Application No. 201110050499.3, (Aug. 3, 2012),8 pages.
"Foreign Office Action", Chinese Application No. 201110050499.3, (Nov. 27, 2012),8 pages.
"Foreign Office Action", Chinese Application No. 201110050506.X, (Apr. 2, 2013),11 pages.
"Foreign Office Action", Chinese Application No. 201110050508.9, (Aug. 3, 2012),8 pages.
"Foreign Office Action", Chinese Application No. 201110050508.9, (Mar. 7, 2013),8 pages.
"Foreign Office Action", Chinese Application No. 201110050852.8, (Mar. 26, 2013),10 pages.
"Foreign Office Action", European Patent Application No. 11747907.1, (Jan. 28, 2013),5 pages.
"Foreign Office Action", European Patent Application No. 11748027.7, (Jan. 18, 2013),5 pages.
"Foreign Office Action", European Patent Application No. 11748026.9, (Jan. 16, 2013),5 pages.
"Foreign Office Action", European Patent Application No. 11748029.3, (Jan. 16, 2013),5 pages.
"Foreign Office Action", European Patent Application No. 11748028.5, (Jan. 28, 2013),5 pages.
"iQuery & Css Example—Dropdown Menu", DesignReviver, Retrieved from: <http://designreviver.com/tutorials/jquery-css-example-dropdown-menu/> on Nov. 22, 2011,(Oct. 7, 2008),30 pages.
"New MS Courier Leak Details Multi-Touch Interface", Retrieved from: <http://www.electronista.com/articles/09/11/04/courier.gestures.ui.explained/> on Nov. 20, 2009, (Nov. 4, 2009),9 pages.
"Non-Final Office Action", U.S. Appl. No. 12/695,842, (May 22, 2013),16 pages.
"Non-Final Office Action", U.S. Appl. No. 12/695,842, (Oct. 3, 2012),16 pages.
"Non-Final Office Action", U.S. Appl. No. 12/695,937, (Apr. 25, 2012),14 pages.
"Non-Final Office Action", U.S. Appl. No. 12/695,976, (Sep. 11, 2012),8 pages.
"Non-Final Office Action", U.S. Appl. No. 12/700,357, (Jul. 2, 2012),10 pages.
"Non-Final Office Action", U.S. Appl. No. 12/700,460, (Jan. 13, 2012),21 pages.
"Non-Final Office Action", U.S. Appl. No. 12/700,510, (Feb. 7, 2012),20 pages.
"Non-Final Office Action", U.S. Appl. No. 12/709,204, (Jun. 6, 2013),27 pages.
"Non-Final Office Action", U.S. Appl. No. 12/709,204, (May 10, 2012),20 pages.
"Non-Final Office Action", U.S. Appl. No. 12/709,245, (May 30, 2013),15 pages.
"Non-Final Office Action", U.S. Appl. No. 12/709,245, (Nov. 30, 2011),11 pages.
"Non-Final Office Action", U.S. Appl. No. 12/709,245, (Mar. 21, 2012),14 pages.
"Non-Final Office Action", U.S. Appl. No. 12/709,282, (Feb. 28, 2013),11 pages.
"Non-Final Office Action", U.S. Appl. No. 12/709,282, (Apr. 12, 2012),9 pages.
"Non-Final Office Action", U.S. Appl. No. 12/709,301, (May 14, 2013),14 pages.
"Non-Final Office Action", U.S. Appl. No. 12/709,301, (Nov. 28, 2011),9 pages.
"Non-Final Office Action", U.S. Appl. No. 12/709,301, (Sep. 13, 2012),13 pages.
"Non-Final Office Action", U.S. Appl. No. 12/709,348, (Apr. 25, 2013),15 pages.
"Non-Final Office Action", U.S. Appl. No. 12/709,348, (Dec. 7, 2011),12 pages.
"Non-Final Office Action", U.S. Appl. No. 12/709,348, (Aug. 2, 2012),14 pages.
"Non-Final Office Action", U.S. Appl. No. 12/709,376, (May 23, 2013),17 pages.
"Non-Final Office Action", U.S. Appl. No. 12/709,376, (Jan. 23, 2012),14 pages.
"Non-Final Office Action", U.S. Appl. No. 12/709,376, (Aug. 17, 2012),17 pages.
"Non-Final Office Action", U.S. Appl. No. 12/713,053, (Nov. 23, 2012),13 pages.
"Non-Final Office Action", U.S. Appl. No. 12/713,053, (Feb. 3, 2012),8 pages.
"Non-Final Office Action", U.S. Appl. No. 12/713,081, (Nov. 29, 2012),9 pages.
"Non-Final Office Action", U.S. Appl. No. 12/713,081, (Dec. 23, 2011),18 pages.
"Non-Final Office Action", U.S. Appl. No. 12/713,096, (Jun. 26, 2013),8 pages.
"Non-Final Office Action", U.S. Appl. No. 12/713,096, (Jun. 6, 2012),9 pages.
"Non-Final Office Action", U.S. Appl. No. 12/713,110, (May 3, 2013),10 pages.
"Non-Final Office Action", U.S. Appl. No. 12/713,110, (Jun. 21, 2012),21 pages.
"Non-Final Office Action", U.S. Appl. No. 12/713,113, (Apr. 23, 2013),18 pages.
"Non-Final Office Action", U.S. Appl. No. 12/713,113, (Dec. 22, 2011),20 pages.
"Non-Final Office Action", U.S. Appl. No. 12/713,118, (Jun. 8, 2012),7 pages.
"Non-Final Office Action", U.S. Appl. No. 12/713,127, (Dec. 27, 2011),22 pages.
"Non-Final Office Action", U.S. Appl. No. 12/713,130, (Jan. 16, 2013),5 pages.
"Non-Final Office Action", U.S. Appl. No. 12/713,130, (Jan. 23, 2012),7 pages.
"Non-Final Office Action", U.S. Appl. No. 12/713,133, (Jan. 14, 2013),8 pages.
"Non-Final Office Action", U.S. Appl. No. 12/713,133, (Jan. 31, 2012),7 pages.
"Non-Final Office Action", U.S. Appl. No. 13/484,075, (Jan. 15, 2013),9 pages.
"Notice of Allowance", U.S. Appl. No. 12/695,064, (Mar. 28, 2012),12 pages.
"Notice of Allowance", U.S. Appl. No. 12/695,959, (Apr. 17, 2012),13 pages.
"Notice of Allowance", U.S. Appl. No. 12/713,053, (Jun. 7, 2013),7 pages.
"Notice of Allowance", U.S. Appl. No. 12/713,130, (Feb. 19, 2013),5 pages.

(56) References Cited

OTHER PUBLICATIONS

"PCT Search Report and Written Opinion", Application No. PCT/US2011/025131, (Oct. 31, 2011),10 pages.
"PCT Search Report and Written Opinion", Application No. PCT/US2011/025974, (Oct. 26, 2011),8 pages.
"PCT Search Report and Written Opinion", Application No. PCT/US2011/025973, (Oct. 27, 2011),13 pages.
"PCT Search Report and Written Opinion", Application No. PCT/US2011/025132, (Oct. 26, 2011),10 pages.
"PCT Search Report and Written Opinion", Application No. PCT/US2011/025575, (Sep. 30, 2011),14 pages.
"PCT Search Report and Written Opinion", Application No. PCT/US2011/025971, (Oct. 31, 2011),15 pages.
"PCT Search Report and Written Opinion", Application No. PCT/US/2011025972, (Sep. 30, 2011),14 pages.
"PCT Search Report and Written Opinion", Application No. PCT/US2011/020412, (Aug. 31, 2011),9 pages.
"PCT Search Report and Written Opinion", Application No. PCT/US2011/020410, (Sep. 27, 2011),9 pages.
"PCT Search Report and Written Opinion", Application No. PCT/US2011/020417, (Oct. 20, 2011),8 pages.
"Supplementary European Search Report", European Patent Application No. 11747907.1, (Nov. 7, 2012),3 pages.
"Supplementary European Search Report", European Patent Application No. 11748028.5, (Nov. 7, 2012),3 pages.
"Supplementary European Search Report", European Patent Application No. 11748027.7, (Nov. 29, 2012),3 pages.
Appleinsider, "Special Report: Apple's Touch-Sensitive iPod Ambitions Disclosed in Filing", Retrieved from: <http://www.appleinsider.com/articles/06/10/26/special_report_apples_touch_sensitive_ipod_ambitions_disclosed_in_filing.html> on Nov. 11, 2009, (Oct. 26, 2006),10 pages.
Brandl, Peter et al., "Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories,(May 2008),10 pages.
Daniels, Martyn "Brave New World", Retrieved from: <http://bookseller-association.blogspot.com/2009_03_01_archive.html> on Nov. 10, 2009, (Mar. 2009),54 pages.
Elliott, Matthew "First Dell, Then HP: What's Next for N-trig's Multitouch Screen Technology", Retrieved from: <http://news.cnet.com/8301-17938_105-10107886-1.html> Nov. 11, 2009, (Nov. 25, 2008),5 pages.
Emigh, Jacqueline "Lenovo Launches Windows 7 ThinkPads with Multitouch and Outdoor Screens"Retrieved from: <http://www.betanews.com/article/Lenovo-launches-Windows-7-ThinkPads-with-multitouch-and-outdoor-screens/1253017166> on Nov. 11, 2009, (Sep. 15, 2009),3 pages.
Gross, Mark D., "Stretch-A-Sketch: A Dynamic Diagrammer", *IEEE Symposium on Visual Languages,* Available at <http://depts.washington.edu/dmachine/PAPER/VL94/vl.html>,(Oct. 1994),11 pages.
Hinckley, Ken et al., "Codex: A Dual Screen Tablet Computer", *Conference on Human Factors in Computing Systems,* (Apr. 9, 2009),10 pages.
Hinckley, Ken et al., "Stitching: Pen Gestures that Span Multiple Displays", *CHI 2004,* Available at <http://www.cs.cornell.edu/~francois/Papers/2004-Hinckley-AVI04-Stitching.>,(2004),pp. 1-8.
Krazit, Tom "Has Apple Found the Magic Touch?", Retrieved from: <http://news.cnet.com/8301-13579_3-9879471-37.html> on Nov. 10, 2009, (Feb. 26, 2008),2 pages.
Minsky, Margaret R., "Manipulating Simulated Objects with Real-world Gestures using a Force and Position Sensitive Screen", *Computer Graphics,* vol. 18, No. 3, Available at <http://delivery.acm.org/10.1145/810000/808598/p195-minsky.pdf?key1=808598&key2=2244955521&coll=GUIDE&dl=GUIDE&CFID=57828830&CFTOKEN=43421964>,(Jul. 1984),pp. 195-203.

Olwal, Alex et al., "Rubbing and Tapping for Precise and Rapid Selection on Touch-Screen Displays", *Conference on Human Factors in Computing Systems,* Available at <http://www.csc.kth.se/~alx/projects/research/rubbing/olwal_rubbing_tapping_chi_2008.pdf>,(Apr. 2008),10 pages.
Pierce, Jeffrey S., et al., "Toolspaces and Glances: Storing, Accessing, and Retrieving Objects in 3D Desktop Applications", *1999 Symposium on Interactive 3D Graphics,* Available at <http://delivery.acm.org/10.1145/310000/300545/p163-pierce.pdf?key1=300545&key2=8792497521&coll=GUIDE&dl=GUIDE&CFID=61004073&CFTOKEN=28819248>,(Apr. 1999),pp. 163-168.
Roth, Volker et al., "Bezel Swipe: Conflict-Free Scrolling and Multiple Selection on Mobile Touch Screen Devices", *CHI 2009,* Available at <http://www.volkerroth.com/download/Roth2009a.pdf>,(Apr. 2009),4 pages.
Vigil, Jose M., "Methods for Controlling a Floating Cursor on a Multi-touch Mobile Phone or Tablet in Conjunction with Selection Gestures and Content Gestures", U.S. Appl. No. 61/304,972,(Feb. 16, 2010),54 pages.
Yee, Ka-Ping "Two-Handed Interaction on a Tablet Display", Retrieved from: <http://zesty.ca/tht/yee-tht-chi2004-short.pdf>, Conference on Human Factors in Computing Systems,(Apr. 2004),4 pages.
"Final Office Action", U.S. Appl. No. 12/709,204, (Sep. 12, 2013), 24 pages.
"Final Office Action", U.S. Appl. No. 12/709,282, (Jul. 16, 2013), 11 pages.
"Final Office Action", U.S. Appl. No. 12/709,301, (Sep. 3, 2013), 12 pages.
"Final Office Action", U.S. Appl. No. 12/709,348, (Sep. 12, 2013), 12 pages.
"Final Office Action", U.S. Appl. No. 12/709,376, (Sep. 10, 2013), 12 pages.
"Final Office Action", U.S. Appl. No. 12/713,113, (Oct. 8, 2013), 21 pages.
"Non-Final Office Action", U.S. Appl. No. 12/709,301, Oct. 24, 2013, 11 pages.
"Non-Final Office Action", U.S. Appl. No. 12/709,282, Oct. 10, 2013, 12 pages.
"Notice of Allowance", U.S. Appl. No. 12/713,110, Dec. 4, 2013, 13 pages.
"Final Office Action", U.S. Appl. No. 12/695,842, Dec. 2, 2013, 17 pages.
"Advisory Action", U.S. Appl. No. 12/709,376, Dec. 19, 2013, 2 pages.
"Ex Parte Mewherter, PTAB precedential decision", U.S. Appl. No. 10/685,192, May 8, 2013, 22 pages.
"Non-Final Office Action", U.S. Appl. No. 12/709,204, Nov. 20, 2013, 31 pages.
"Notice of Allowance", U.S. Appl. No. 12/713,133, Jan. 17, 2014, 4 pages.
"Non-Final Office Action", U.S. Appl. No. 12/713,133, Dec. 10, 2013, 8 pages.
"Non-Final Office Action", U.S. Appl. No. 12/709,348, Dec. 20, 2013, 9 pages.
"Adobe Acrobat 8 Standard User Guide", Adobe Systems Incorporated,2007, pp. 34 & 36.
"Advisory Action", U.S. Appl. No. 12/414,382, Jan. 20, 2012, 3 pages.
"Advisory Action", U.S. Appl. No. 12/433,605, Apr. 5, 2012, 3 pages.
"Alltel Adds Dedicated Search Key to Phones", Retrieved from: <http://www.phonescoop.com/news/item.php?n=2159> on Nov. 26, 2008., Apr. 12, 2007, 2 Pages.
"Android 2.3 User's Guide", AUG-2.3-103, Android mobile technology platform 2.3, Dec. 13, 2010, 380 pages.
"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.
"Application User Model IDs", Retrieved from: <http://msdn.microsoft.com/en-us/library/dd378459(VS.85).aspx> on Sep. 28, 2010, 6 pages.

(56) References Cited

OTHER PUBLICATIONS

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.

"Basics of Your Device: Get Familiar with the Home Screen", Nokia USA—How to, retrieved from <http://www.nokia.ca/get-support-and-software/product-support/c6-01/how-to#> on May 11, 2011, 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.

"Calc4M", Retrieved from: <http://www.hellebo.com/Calc4M.html> on Dec. 11, 2008, Sep. 10, 2008, 4 Pages.

"Class ScrollView", Retrieved from: <http://www.blackberry.com/developers/docs/6.0.0api/net/rim/device/api/ui/ScrollView.html> on Sep. 28, 2010, 13 pages.

"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 5 Pages.

"Dial a number", Retrieved from: <http://www.phonespell.org/ialhelp.html> on Nov. 20, 2008, 1 page.

"DuoSense™ Multi-Touch Gestures", Retrieved from: <http://www.n-trig.com/Data/Uploads/Misc/DuoSenseMTG_final.pdf>, Jul. 2008, 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.

"Email Notification for Microsoft Outlook and Outlook Express", Retrieved from: <http://www.contextmagic.com/express-notification/> on Sep. 29, 2010, Jul. 21, 2004, 3 pages.

"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>,Apr. 8, 2008, pp. 1-19.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.

"Extended European Search Report", European Patent Application No. 09818253.8, Apr. 10, 2012, 7 pages.

"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>,Feb. 2006, 15 pages.

"Final Office Action", U.S. Appl. No. 11/305,789, Apr. 1, 2009, 10 pages.

"Final Office Action", U.S. Appl. No. 11/502,264, Feb. 4, 2010, 15 pages.

"Final Office Action", U.S. Appl. No. 11/502,264, Apr. 3, 2009, 9 pages.

"Final Office Action", U.S. Appl. No. 12/244,545, Dec. 7, 2011, 16 pages.

"Final Office Action", U.S. Appl. No. 12/244,545, Sep. 7, 2012, 23 pages.

"Final Office Action", U.S. Appl. No. 12/413,977, Nov. 17, 2011, 16 pages.

"Final Office Action", U.S. Appl. No. 12/414,382, Dec. 23, 2011, 7 pages.

"Final Office Action", U.S. Appl. No. 12/414,476, Dec. 1, 2011, 20 pages.

"Final Office Action", U.S. Appl. No. 12/433,605, Feb. 3, 2012, 11 pages.

"Final Office Action", U.S. Appl. No. 12/433,667, Sep. 13, 2011, 17 pages.

"Final Office Action", U.S. Appl. No. 12/469,458, Nov. 17, 2011, 15 pages.

"Final Office Action", U.S. Appl. No. 12/469,480, Feb. 9, 2012, 17 pages.

"Final Office Action", U.S. Appl. No. 12/484,799, Apr. 30, 2012, 13 pages.

"Final Office Action", U.S. Appl. No. 12/560,081, Mar. 14, 2012, 16 pages.

"Final Office Action", U.S. Appl. No. 12/721,422, Mar. 7, 2013, 10 pages.

"Final Office Action", U.S. Appl. No. 13/118,181, Dec. 20, 2013, 18 pages.

"Final Office Action", U.S. Appl. No. 13/118,204, Nov. 21, 2013, 24 pages.

"Final Office Action", U.S. Appl. No. 13/118,321, Dec. 19, 2013, 30 pages.

"Final Office Action", U.S. Appl. No. 13/118,339, Aug. 22, 2013, 21 pages.

"Final Office Action", U.S. Appl. No. 13/118,347, Aug. 15, 2013, 25 pages.

"Final Office Action", U.S. Appl. No. 13/224,258, Sep. 11, 2013, 37 pages.

"Final Office Action", U.S. Appl. No. 13/657,621, Sep. 10, 2013, 18 pages.

"Final Office Action", U.S. Appl. No. 13/657,646, May 6, 2013, 12 pages.

"Final Office Action", U.S. Appl. No. 13/658,694, Oct. 30, 2013, 17 pages.

"Foreign Office Action", CN Application No. 201110437572.2, Dec. 3, 2013, 7 pages.

"Freeware.mobi", Retrieved from: <http://www.palmfreeware.mobi/download-palette.html> on Nov. 6, 2008, Oct. 9, 2001, 2 pages.

"GnomeCanvas", Retrieved from: <http://library.gnome.org/devel/libgnomecanvas/unstable/GnomeCanvas.html> on Sep. 28, 2010, 11 pages.

"How Do I Cancel a "Drag" Motion on an Android Seekbar?", retrieved from <http://stackoverflow.com/questions/2917969/how-do-i-cancel-a-drag-motion-on-anandroid-seekbar> on Jun. 20, 2011,May 28, 2010, 1 page.

"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.

"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.

"HTC Shows HTC Snap with Snappy Email Feature", Retrieved from: <http://www.wirelessandmobilenews.com/smartphones/> on May 5, 2009>, May 4, 2009, 10 Pages.

"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.

"International Search Report and Written Opinion", Application No. PCT/US2010/028555, Oct. 12, 2010, 10 pages.

"International Search Report and Written Opinion", Application No. PCT/US2010/028699, Oct. 4, 2010, 10 pages.

"International Search Report and Written Opinion", Application No. PCT/US2011/067075, Dec. 12, 2012, 10 pages.

"International Search Report and Written Opinion", Application No. PCT/US2009/061382, May 26, 2010, 10 pages.

"International Search Report and Written Opinion", Application No. PCT/US2011/055725, Sep. 27, 2012, 10 pages.

"International Search Report and Written Opinion", Application No. PCT/US2009/061735, Jun. 7, 2010, 11 pages.

"International Search Report and Written Opinion", Application No. PCT/US2010/034772, Dec. 29, 2010, 12 pages.

"International Search Report and Written Opinion", Application No. PCT/US2010/038730, Jan. 19, 2011, 8 pages.

"International Search Report and Written Opinion", Application No. PCT/US2011/055513, Mar. 27, 2012, 8 pages.

(56) References Cited

OTHER PUBLICATIONS

"International Search Report and Written Opinion", Application No. PCT/US2011/055514, May 22, 2012, 8 pages.
"International Search Report and Written Opinion", Application No. PCT/US2011/055512, May 24, 2012, 8 pages.
"International Search Report and Written Opinion", Application No. PCT/US2011/055520, May 9, 2012, 8 pages.
"International Search Report and Written Opinion", Application No. PCT/US2011/055524, Jun. 1, 2012, 8 pages.
"International Search Report and Written Opinion", Application No. PCT/US2011/065702, Aug. 29, 2012, 8 pages.
"International Search Report and Written Opinion", Application No. PCT/US2011/055736, Sep. 17, 2012, 8 pages.
"International Search Report and Written Opinion", Application No. PCT/US2011/067073, Sep. 17, 2012, 8 pages.
"International Search Report and Written Opinion", Application No. PCT/US2011/055511, Apr. 24, 2012, 9 pages.
"International Search Report and Written Opinion", Application No. PCT/US2011/055523, May 10, 2012, 9 pages.
"International Search Report and Written Opinion", Application No. PCT/US2011/055521, May 15, 2012, 9 pages.
"International Search Report and Written Opinion", Application No. PCT/US2011/055522, May 15, 2012, 9 pages.
"International Search Report and Written Opinion", Application No. PCT/US2011/055496, Sep. 12, 2012, 9 pages.
"International Search Report and Written Opinion", Application No. PCT/US2011/055712, Sep. 21, 2012, 9 pages.
"International Search Report and Written Opinion", Application No. PCT/US2011/055493, Sep. 26, 212, 9 pages.
"International Search Report and Written Opinion", Application No. PCT/US2011/055478, Sep. 27, 2012, 9 pages.
"International Search Report and Written Opinion", Application No. PCT/US2011/055746, Sep. 27, 2012, 9 pages.
"International Search Report", Application No. PCT/US2009/061864, May 14, 2010, 10 pages.
"International Search Report", Application No. PCT/US2010/028553, Application Filing Date: Mar. 24, 2010,Nov. 9, 2010, 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc. ,2009, 153 pages.
"Keyboard (5)", Retrieved from: <http://landru.uwaterloo.ca/cgi-bin/man.cgi?section=5&topic=keyboard> on Dec. 11, 2008., Aug. 11, 1997, 8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,Aug. 16, 2007, 2 pages.
"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.
"Magic mouse", Retrieved from: <http://www.apple.com/magicmouse/> on May 10, 2011, 3 pages.
"MIDTB Tip Sheet: Book Courier", Retrieved from: <http://www.midtb.org/tipsbookcourier.htm> on Dec. 11, 2008., Sep. 26, 2005, 6 Pages.

"Mobile/UI/Designs/TouchScreen/workingUI", Retrieved from: <https://wiki.mozilla.org/Mobile/UI/Designs/TouchScreen/workingUI> on Oct. 26, 2009, 30 pages.
"moGo beta v.0.4", Retrieved from: <http://forum.xda-developers.com/showthread.php?t=375196> on Sep. 27, 10, Mar. 7, 2008, 10 pages.
"Multi-touch", Retrieved from <http://en.wikipedia.org/wiki/Multi-touch#Microsoft_Surface> on Apr. 24, 2009, Apr. 17, 2009, 8 pages.
"New Features in WhatsUp Gold v12.0", retrieved from <http://www.netbright.co.th/?name=product&file=readproduct&id=12> on Jun. 10, 2011, 4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Non-Final Office Action", U.S. Appl. No. 11/215,052, Jun. 23, 2011, 17 pages.
"Non-Final Office Action", U.S. Appl. No. 11/305,789, Sep. 21, 2009, 5 pages.
"Non-Final Office Action", U.S. Appl. No. 11/502,264, Sep. 30, 2009, 15 pages.
"Non-Final Office Action", U.S. Appl. No. 11/502,264, Sep. 14, 2012, 14 pages.
"Non-Final Office Action", U.S. Appl. No. 12/244,545, Mar. 27, 2012, 18 pages.
"Non-Final Office Action", U.S. Appl. No. 12/244,545, Aug. 17, 2011, 15 pages.
"Non-Final Office Action", U.S. Appl. No. 12/413,977, Jul. 19, 2011, 17 pages.
"Non-Final Office Action", U.S. Appl. No. 12/413,977, Jul. 20, 2012, 18 pages.
"Non-Final Office Action", U.S. Appl. No. 12/414,382, Jul. 26, 2011, 9 pages.
"Non-Final Office Action", U.S. Appl. No. 12/414,434, Jan. 17, 2012, 7 pages.
"Non-Final Office Action", U.S. Appl. No. 12/414,434, May 31, 2012, 7 pages.
"Non-Final Office Action", U.S. Appl. No. 12/414,434, Aug. 2, 2011, 6 pages.
"Non-Final Office Action", U.S. Appl. No. 12/414,455, Aug. 29, 2011, 8 pages.
"Non-Final Office Action", U.S. Appl. No. 12/414,458, Jul. 6, 2011, 8 pages.
"Non-Final Office Action", U.S. Appl. No. 12/414,476, Nov. 9, 2012, 22 pages.
"Non-Final Office Action", U.S. Appl. No. 12/414,476, Aug. 3, 2011, 21 pages.
"Non-Final Office Action", U.S. Appl. No. 12/433,605, Jun. 24, 2011, 10 pages.
"Non-Final Office Action", U.S. Appl. No. 12/433,667, Jun. 7, 2011, 15 pages.
"Non-Final Office Action", U.S. Appl. No. 12/433,667, Feb. 3, 2012, 16 pages.
"Non-Final Office Action", U.S. Appl. No. 12/469,419, Nov. 9, 2011, 15 pages.
"Non-Final Office Action", U.S. Appl. No. 12/469,419, May 23, 2012, 13 pages.
"Non-Final Office Action", U.S. Appl. No. 12/469,458, Jul. 1, 2011, 15 pages.
"Non-Final Office Action", U.S. Appl. No. 12/469,458, Sep. 21, 2012, 14 pages.
"Non-Final Office Action", U.S. Appl. No. 12/469,480, Oct. 17, 2012, 16 pages.
"Non-Final Office Action", U.S. Appl. No. 12/469,480, Sep. 22, 2011, 14 pages.
"Non-Final Office Action", U.S. Appl. No. 12/470,558, Nov. 22, 2011, 9 pages.
"Non-Final Office Action", U.S. Appl. No. 12/480,969, Aug. 7, 2012, 15 pages.
"Non-Final Office Action", U.S. Appl. No. 12/484,799, Aug. 11, 2011, 12 pages.
"Non-Final Office Action", U.S. Appl. No. 12/484,799, Aug. 7, 2012, 13 pages.

(56) References Cited

OTHER PUBLICATIONS

"Non-Final Office Action", U.S. Appl. No. 12/484,845, Dec. 7, 2011, 16 pages.
"Non-Final Office Action", U.S. Appl. No. 12/560,081, Dec. 7, 2011, 16 pages.
"Non-Final Office Action", U.S. Appl. No. 12/713,096, Jan. 30, 2014, 23 pages.
"Non-Final Office Action", U.S. Appl. No. 12/713,127, Jan. 31, 2014, 21 pages.
"Non-Final Office Action", U.S. Appl. No. 12/721,422, Oct. 1, 2012, 7 pages.
"Non-Final Office Action", U.S. Appl. No. 12/977,584, Dec. 7, 2012, 8 pages.
"Non-Final Office Action", U.S. Appl. No. 12/983,106, Nov. 9, 2012, 17 pages.
"Non-Final Office Action", U.S. Appl. No. 13/118,181, Mar. 4, 2013, 22 pages.
"Non-Final Office Action", U.S. Appl. No. 13/118,204, Feb. 28, 2013, 13 pages.
"Non-Final Office Action", U.S. Appl. No. 13/118,221, Mar. 1, 2013, 22 pages.
"Non-Final Office Action", U.S. Appl. No. 13/118,257, Mar. 5, 2013, 19 pages.
"Non-Final Office Action", U.S. Appl. No. 13/118,302, Mar. 4, 2014, 10 pages.
"Non-Final Office Action", U.S. Appl. No. 13/118,314, Feb. 27, 2014, 13 pages.
"Non-Final Office Action", U.S. Appl. No. 13/118,321, Jun. 10, 2013, 32 pages.
"Non-Final Office Action", U.S. Appl. No. 13/118,333, Jul. 5, 2013, 18 pages.
"Non-Final Office Action", U.S. Appl. No. 13/118,339, Feb. 11, 2013, 15 pages.
"Non-Final Office Action", U.S. Appl. No. 13/118,347, Feb. 12, 2013, 14 pages.
"Non-Final Office Action", U.S. Appl. No. 13/224,258, Jan. 8, 2013, 35 pages.
"Non-Final Office Action", U.S. Appl. No. 13/229,155, Nov. 18, 2013, 14 pages.
"Non-Final Office Action", U.S. Appl. No. 13/492,495, Sep. 17, 2012, 8 pages.
"Non-Final Office Action", U.S. Appl. No. 13/657,621, Feb. 7, 2013, 19 pages.
"Non-Final Office Action", U.S. Appl. No. 13/657,646, Jan. 3, 2013, 13 pages.
"Non-Final Office Action", U.S. Appl. No. 13/658,694, Feb. 13, 2014, 19 pages.
"Non-Final Office Action", U.S. Appl. No. 13/658,694, Apr. 26, 2013, 13 pages.
"Notice of Allowance", U.S. Appl. No. 11/215,052, Mar. 14, 2012, 5 pages.
"Notice of Allowance", U.S. Appl. No. 11/305,789, Nov. 23, 2009, 8 pages.
"Notice of Allowance", U.S. Appl. No. 12/414,382, Apr. 4, 2012, 4 pages.
"Notice of Allowance", U.S. Appl. No. 12/414,434, Aug. 17, 2012, 4 pages.
"Notice of Allowance", U.S. Appl. No. 12/414,455, Jan. 4, 2012, 4 pages.
"Notice of Allowance", U.S. Appl. No. 12/414,458, Oct. 31, 2011, 2 pages.
"Notice of Allowance", U.S. Appl. No. 12/414,458, Nov. 29, 2011, 2 pages.
"Notice of Allowance", U.S. Appl. No. 12/414,458, Aug. 10, 2011, 6 pages.
"Notice of Allowance", U.S. Appl. No. 12/470,558, Apr. 2, 2012, 7 pages.
"Notice of Allowance", U.S. Appl. No. 12/470,558, Aug. 23, 2012, 2 pages.
"Notice of Allowance", U.S. Appl. No. 12/484,799, Oct. 22, 2012, 10 pages.
"Notice of Allowance", U.S. Appl. No. 12/484,845, Mar. 16, 2012, 5 pages.
"Notice of Allowance", U.S. Appl. No. 12/721,422, Jul. 11, 2013, 9 pages.
"Notice of Allowance", U.S. Appl. No. 12/977,584, Jun. 19, 2013, 5 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"Restriction Requirement", U.S. Appl. No. 13/118,288, Mar. 4, 2014, 7 pages.
"Restriction Requirement", U.S. Appl. No. 13/658,694, Feb. 6, 2013, 6 pages.
"SecureMe-Anti-Theft Security Application for S60 3rd", Retrieved from: <http://www.killermobile.com/newsite/mobile-software/s60-applications/secureme-%11-anti%11theft-security-application-for-s60-3rd.htm> on Jun. 28, 2011, Dec. 15, 2008, 3 pages.
"Snap", Windows 7 Features, retrieved from <http://windows.microsoft.com/en-US/windows7/products/features/snap> on Sep. 23, 2011, 2 pages.
"Supplemental Notice of Allowance", U.S. Appl. No. 12/713,133, Feb. 3, 2014, 2 pages.
"Supplemental Notice of Allowance", U.S. Appl. No. 12/977,584, Sep. 16, 2013, 2 pages.
"Supplemental Notice of Allowance", U.S. Appl. No. 12/977,584, Oct. 11, 2013, 2 pages.
"Symbian Applications", Retrieved from: <http://symbianfullversion.blogspot.com/2008_12_01_archive.html> on May 5, 2009., Jan. 2009, 51 Pages.
"The Map Screen", retrieved from <http://www.symbianos.org/whereamiusersguide> on Jun. 17, 2011, 3 pages.
"Top 3 Task Switchers for Andriod", TechCredo, retrieved from <http://www.techcredo.com/android/top-3-task-switchers-for-android> on May 11, 2011,Mar. 9, 2011, 5 pages.
"Top Android App: Swipepad", Best Android Apps Review, retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"User Guide", retrieved from <http://wireframesketcher.com/help/help.html> on Jun. 17, 2011, 19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011,Jun. 2, 2011, 6 pages.

(56) References Cited

OTHER PUBLICATIONS

"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOFFICE tutorial!, retrieved from <http://www.msoffice-tutorial.com/working-with-multiple-windows.php> on Sep. 23, 2011, 3 pages.
"You've Got Mail 1.4 Build", retrieved from <http://www.fileshome.com/Shows_Animation_Plays_Sound_Automatic_N . . . > on Jan. 6, 2010, Jun. 18, 2007, 2 pages.
"YUI 3: ScrollView [beta]", Retrieved from: <http://developer.yahoo.com/yui/3/scrollview/> on Sep. 28, 2010, 5 pages.
Bates, "A Framework to Support Large-Scale Active Applications", University of Cambridge Computer Laboratory, Available at <http://citeseerx.ist.psu.edu/viewdoc/download?doi=10.1.1.48.1690&rep=rep1&type=pdf>,1996, 8 pages.
Beiber, et al., "Screen Coverage: A Pen-Interaction Problem for PDA's and Touch Screen Computers", in Proceedings of ICWMC 2007,Mar. 2007, 6 pages.
Bjork, et al., "Redefining the Focus and Context of Focus+Context Visualizations", In Proceedings of INFOVIS 2000, Available at <http://www.johan.redstrom.se/papers/redefining.pdf>,Oct. 2000, 9 pages.
Bowes, et al., "Transparency for Item Highlighting", Faculty of Computing Science, Dalhousie University, Available at <http://torch.cs.dal.ca/~dearman/pubs/GI2003-bowes,dearman,perkins-paper.pdf>,2003, 2 pages.
Buring, "User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1type=pdf>,Sep. 2006, pp. 829-836.
Carrera, et al., "Conserving Disk Energy in Network Servers", available at <http://citeseerx.ist.psu.edu/viewdoc/download?doi=10.1.1.6.8301&rep=rep1&type=ps>, Nov. 2002, 15 pages.
Cawley, "How to Customise Your Windows Phone 7", Retrieved from: <http://www.brighthub.com/mobile/windows-mobile-platform/articles/95213.aspx> on May 10, 2011,Nov. 12, 2010, 3 pages.
Cawley, "Windows Phone 7 Customization Tips and Tricks", retrieved from <http://www.brighthub.com/mobile/windows-mobile-platform/articles/95213.aspx> on Jun. 20, 2011,May 16, 2011, 2 pages.
Cohen, et al., "Wang Tiles for Image and Texture Generation", In Proceedings of SIGGRAPH 2003, Available <http://research.microsoft.com/en-us/um/people/cohen/WangFinal.pdf>,2003, 8 pages.
Damien, "7 Ways to Supercharge Multitasking in Android", retrieved from <http://maketecheasier.com/7-ways-to-supercharge-multitasking-in-android/2011/01/22/> on May 11, 2011,Jan. 22, 2011, 5 pages.
Davis, "A WPF Custom Control for Zooming and Panning", Retrieved from: <http://www.codeproject.com/KB/WPF/zoomandpancontrol.aspx> on Sep. 28, 2010, Jun. 29, 2010, 21 pages.
Delimarsky, "Sending Tile Push Notifications on Windows Phone 7", retrieved from <http://mobile.dzone.com/articles/sending-tile-push> on May 10, 2011,Aug. 25, 2010, 2 pages.
Denoue, et al., "WebNC: Efficient Sharing of Web Applications", In Proceedings of WWW 2009, Available at <http://www.fxpal.com/publications/FXPAL-PR-09495.pdf>,2009, 2 pages.
Dolcourt, "Webware", Retrieved from: <http://news.cnet.com/webware/?categoryId=2010> on May 5, 2009, 13 Pages.
Dunsmuir, "Selective Semantic Zoom of a Document Collection", Available at <http://www.cs.ubc.ca/~tmm/courses/533/projects/dustin/proposal.pdf>,Oct. 30, 2009, pp. 1-9.
Farrugia, et al., "Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, Oct. 21, 2008, 2 pages.
Fisher, "Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.
Gade, "Samsung Alias u740", Retrieved from: <http://www.mobiletechreview.com/phones/Samsung-U740.htm> on Nov. 20, 2008, Mar. 14, 2007, 6 pages.
Gao, "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.
Ha, et al., "SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.
Harrison, "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press,Jun. 16, 2003, 4 pages.
Hickey, "Google Android has Landed; T-Mobile, HTc Unveil G1", Retrieved from: <http://www.crn.com/retail/210603348> on Nov. 26, 2008., Sep. 23, 2008, 4 pages.
Janecek, et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf >,Feb. 15, 2005, pp. 1-15.
Kcholi, "Windows CE .NET Interprocess Communication", Retrieved from http://msdn.microsoft.com/en-us/library/ms836784.aspx on Jul. 17, 2008., Jan. 2004, 15 Pages.
Keranen, "OpenGL-based User Interface Toolkit for Symbian Mobile Devices", Master of Science Thesis, Tamere University of Technology, Department of Information Technology, Apr. 6, 2005, 88 pages.
Kurdi, "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.
Kurdi, "WinSplit Revolution", Retrieved from <http://www.freewaregenius.com/winsplit-revolution/> on Jun. 30, 2013, Aug. 22, 2007, 4 Pages.
La, "Parallax Gallery", Available at <http://webdesignerwall.comtutorials/parallax-gallery/comment-page-1>,Apr. 25, 2008, 16 pages.
Livingston, et al., "Windows 95 Secrets", 1995, I DG Books Worldwide, 3rd Edition, 1995, pp. 121-127.
Long, "Gmail Manager 0.6", Retrieved from: <https://addons.mozilla.org/en-US/firefox/addon/1320/> on Sep. 29, 2010, Jan. 27, 2010, 4 pages.
Mann, et al., "Spectrum Analysis of Motion Parallax in a 3D Cluttered Scene and Application to Egomotion", Journal of the Optical Society of America A, vol. 22, No. 9, Available at <http://www.cs.uwaterloo.ca/~mannr/snow/josa-mann-langer.pdf>,Sep. 2005, pp. 1717-1731.
Mantia, "Multitasking: What Does It Mean?", retrieved from <http://mantia.me/blog/multitasking/> on Sep. 23, 2011, 3 pages.
Mao, "Comments of Verizon Wireless Messaging Services, LLC", Retrieved from: http://www.ntia.doc.gov/osmhome/warnings/comments/verizon.htm on May 6, 2009., Aug. 18, 2000, 5 Pages.
Marie, "MacBook Trackpad Four Fingers Swipe Left/Right to Switch Applications", MacBook Junkie, retrieved from <http://www.macbookjunkie.com/macbook-trackpad-four-fingers-swipe-left-right-to-switch-applications/> on May 11, 2011,Nov. 13, 2010, 4 pages.

(56) References Cited

OTHER PUBLICATIONS

Mei, et al., "Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.
Oliver, "Potential iPhone Usability and Interface Improvements", Retrieved from: <http://www.appleinsider.com/articles/08/09/18/potential_iphone_usability_and_interface_improvements.html> on Nov. 12, 2008, AppleInsider,Sep. 18, 2008, 4 pages.
Oryl, "Review: Asus P527 Smartphone for North America", Retrieved from: <http://www.mobileburn.com/review.jsp?Id=4257> on Dec. 17, 2008., Mar. 5, 2008, 1 Page.
Padilla, "Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.
Paul, "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.
Perry, "Teach Yourself Windows 95 in 24 Hours", 1997, Sams Publishing, 2nd Edition, 1997, pp. 193-198.
Raghaven, et al., "Model Based Estimation and Verification of Mobile Device Performance", Available at http://alumni.cs.ucsb.edu/~raimisl/emsoft04_12.pdf.,Sep. 27-29, 2004, 10 Pages.
Ray, "Microsoft Re-Tiles Mobile Platform for Windows 7 Era", retrieved from <http://www.theregister.co.uk/2010/02/15/windows_phone_7_series/> on May 11, 2011,Feb. 15, 2010, 2 pages.
Reed, "Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.
Remond, "Mobile Marketing Solutions", Retrieved from: <http://www.mobilemarketingmagazine.co.uk/mobile_social_networking/> on May 5, 2009., Apr. 28, 2009, 16 Pages.
Rice, et al., "A System for Searching Sound Palettes", Proceedings of the Eleventh Biennial Symposium on Arts and Technology,, Available at <http://www.comparisonics.com/FindSoundsPalettePaper.pdf>,Feb. 2008, 6 pages.
Ritchie, "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.
Ritscher, "Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.
Roberts, "Touching and Gesturing on the iPhone", Available at <http://www.sitepen.com/blog/2008/07/10/touching-and-gesturing-on-the-iphone/comments-pare-1>,Jul. 10, 2008, 16 pages.
Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf>,2004, 18 pages.
Singh, et al., "CINEMA: Columbia InterNet Extensible Multimedia Architecture", Available at <http://www1.cs.columbia.edu/~library/TR-repository/reports/reports-2002/cucs-011-02.pdf>,Sep. 3, 2002, 83 Pages.
Smith, et al., "GroupBar: The TaskBar Evolved", Proceedings of OZCHI 2003, Available at <http://research.microsoft.com/pubs/64316/ozchi2003-groupbar.pdf>,Nov. 2003, pp. 1-10.
Steinicke, et al., "Multi—Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>,Jun. 15, 2008, 4 Pages.
Suror, "PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.
Terpstra, "Beta Beat: Grape, a New Way to Manage Your Desktop Clutter", Retrieved from: Beta Beat: Grape, a New Way to Manage Your Desktop Clutter on Jun. 28, 2011, Apr. 14, 2009, 4 pages.
Vermeulen, "BlackBerry PlayBook Hands-on", retrieved from <http://mybroadband.co.za/news/gadgets/20104-BlackBerry-PlayBook-hands-.html> on May 11, 2011,May 8, 2011, 4 pages.
Viticci, "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011,Jul. 6, 2011, 6 pages.
Vornberger, "Bluetile", Retrieved from: <http://www.bluetile.org> on Sep. 29, 2010, 5 pages.
Wilson, "How the iPhone Works", Retrieved from: <http://electronics.howstuffworks.com/iphone2.htm> on Apr. 24, 2009, Jan. 2007, 9 pages.
Wilson, "Robust Computer Vision-Based Detection of Pinching for One and Two-Handed Gesture Input", In Proceedings of UIST 2006, Available at <http://research.microsoft.com/en-us/um/people/awilson/publications/wilsonuist2006/uist%202006%20taffi.pdf>, Oct. 2006, 4 pages.
Wobbrock, et al., "User-Defined Gestures for Surface Computing", CHI 2009, Apr. 4-9, 2009, Boston, MA, available at <http://faculty.washington.edu/wobbrock/pubs/chi-09.2.pdf>,Apr. 4, 2009, 10 pages.
Wu, et al., "Achieving a Superior Ownership Experience in Manageability and Quality for Siebel CRM", available at <http://www.oracle.com/us/products/enterprise-manager/superior-exp-for-siebel-crm-068962.pdf>,Aug. 2008, 25 pages.
Wyatt, "/Flash/the art of parallax scrolling", .net Magazine,Aug. 1, 2007, pp. 74-76.
Yang, et al., "Semantic Photo Album Based on MPEG-4 Compatible Application Format", Retrieved from: <http://ieeexplore.ieee.org/stamp/stamp.jsp?arnumber=04146254.>, 2007, 2 Pages.
"Final Office Action", U.S. Appl. No. 12/709,204, Apr. 11, 2014, 24 pages.
"Final Office Action", U.S. Appl. No. 12/709,282, May 9, 2014, 17 pages.
"Non-Final Office Action", U.S. Appl. No. 12/695,937, May 7, 2014, 11 pages.
"Non-Final Office Action", U.S. Appl. No. 12/700,510, Jun. 12, 2014, 26 pages.
"Non-Final Office Action", U.S. Appl. No. 12/709,301, May 23, 2014, 12 pages.
"Non-Final Office Action", U.S. Appl. No. 12/713,113, Jun. 4, 2014, 11 pages.
"Notice of Allowance", U.S. Appl. No. 12/709,376, Mar. 17, 2014, 6 pages.
"Final Office Action", U.S. Appl. No. 12/695,976, Jul. 23, 2014, 12 pages.
"First Examination Report", NZ Application No. 618254, May 20, 2014, 3 Pages.
"First Examination Report", NZ Application No. 618264, May 20, 2014, 2 pages.
"Non-Final Office Action", U.S. Appl. No. 12/700,357, Jun. 26, 2014, 11 pages.

* cited by examiner

TOUCH PULL-IN GESTURE

BACKGROUND

Portable computer devices are increasingly more common and mobile, such as laptop computers, tablet PCs, ultra-mobile PCs, as well as other mobile data, messaging, and/or communication devices. When a user holds a small, portable device such as a tablet PC or ultra-mobile PC that has an integrated touch-screen, a common interaction technique is to hold the device with one hand and interact with the touch-screen with fingers of the other hand. For example, the user can tap-touch targets, user interface elements, or menu items on the touch-screen with a finger. While portable computer devices have become more mobile and convenient, the size of device integrated displays has decreased to accommodate the mobility and convenience of the devices. Additionally, there is an ever increasing need to display more data and content, such as various application user interfaces on the device integrated displays. As a result, pull-down menus, headers, scrollbars, and other similar display features take up display space that could otherwise be utilized to display the data and other content. A technique utilized to conserve the display space is to hide menus, scrollbars, and other similar user interface features just off-screen and out of the display space. However, it can be difficult for a user to then manipulate various controls and selections to locate and utilize the hidden user interface features.

SUMMARY

This summary is provided to introduce simplified concepts of a touch pull-in gesture. The simplified concepts are further described below in the Detailed Description. This summary is not intended to identify essential features of the claimed subject matter, nor is it intended for use in determining the scope of the claimed subject matter.

Embodiments of a touch pull-in gesture are described. In various embodiments, a touch input is detected that starts at an edge of a touch-screen and progresses as an expanding contact region from the edge of the touch-screen toward approximately a center region of the touch-screen while the touch input remains in contact with the touch-screen. The expanding contact region is determined as a touch pull-in gesture to initiate a display of a user interface component. The touch pull-in gesture can be recognized as a combination of the touch input at the edge of the touch-screen and a motion gesture across the touch-screen. The touch pull-in gesture gives the appearance of dragging the user interface component onto the touch-screen for display, such as a drop-down menu, a scrollbar, or other user interface component that is displayed proximate a location of the touch pull-in gesture on the touch-screen.

BRIEF DESCRIPTION OF THE DRAWINGS

Embodiments of touch pull-in gesture are described with reference to the following drawings. The same numbers are used throughout the drawings to reference like features and components.

DETAILED DESCRIPTION

Embodiments of a touch pull-in gesture provide techniques for a user of a portable device to motion a pull-in gesture which gives the appearance of dragging a user interface component onto a touch-screen of the device for display. For example, a user can initiate a touch input with a finger just off an edge of the touch-screen and then motion a pull-in gesture across the touch-screen. When the motion of the touch pull-in gesture is initiated by the user, a progression of the motion as the touch input remains in contact with the touch-screen creates a contact region on the touch-screen that progressively expands and is detected. The progressive expansion of the contact region on the touch-screen is then determined or recognized as the touch pull-in gesture that initiates a display of a user interface component proximate a location of the touch pull-in gesture on the touch-screen. A user interface component can include any type of hidden menu, slide menu, drop-down menu, scrollbar, and/or any other type of user interface displayable element.

While features and concepts of the described systems and methods for a touch pull-in gesture can be implemented in any number of different environments, systems, and/or various configurations, embodiments of a touch pull-in gesture are described in the context of the following example systems and environments.

Figure 1:
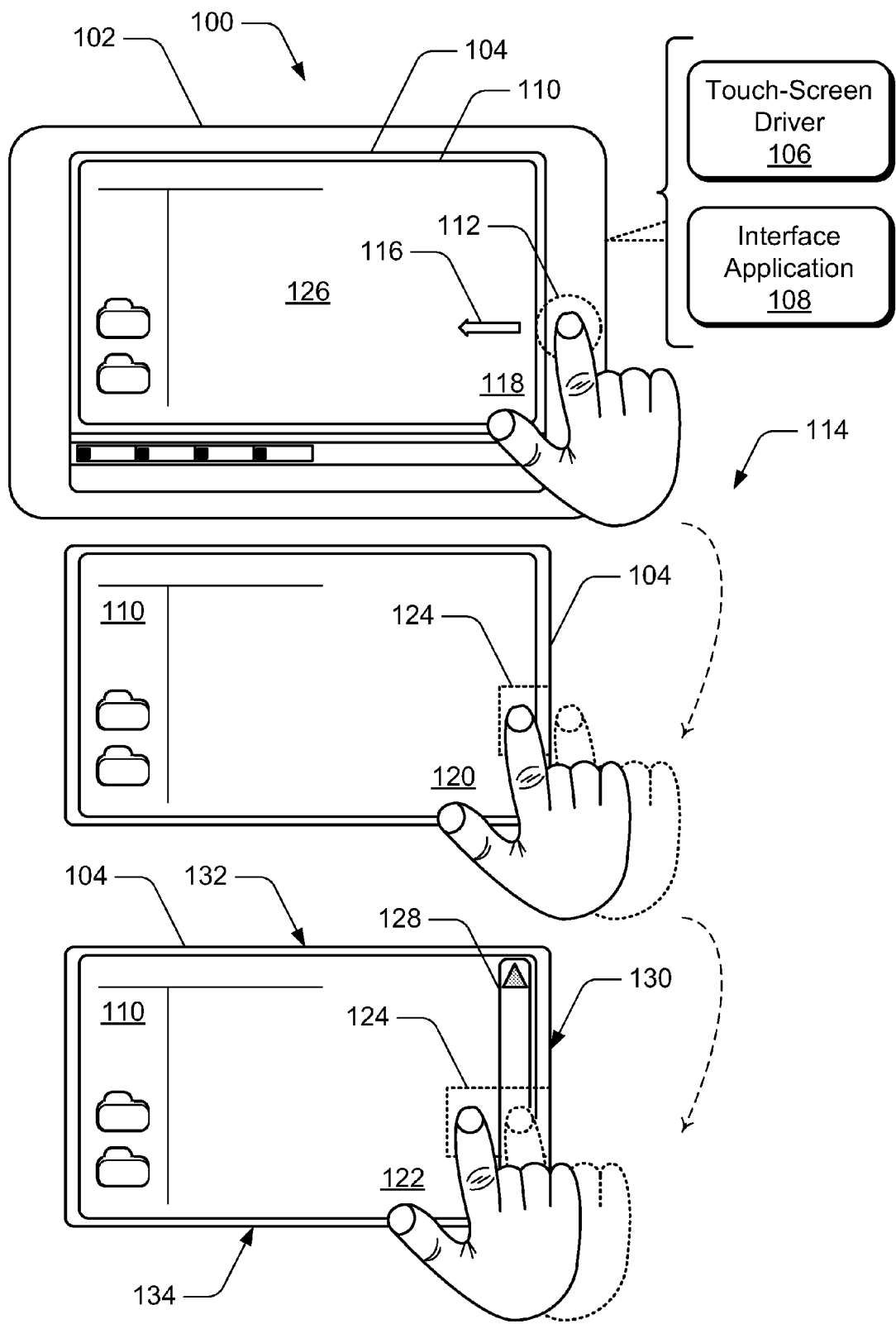
FIG. 1 illustrates an example of a portable device that can implement various embodiments of a touch pull-in gesture.

FIG. 1 illustrates an example 100 of a portable device 102 that can implement various embodiments of a touch pull-in gesture. Portable device 102 is an example of any of the various types of portable devices described with reference to FIG. 2 and can also be implemented with any number and combination of differing components as described with reference to the example device shown in FIG. 4. Portable device 102 includes an integrated touch-screen 104 to display user interfaces, user interface elements and features, user-selectable controls, various displayable objects, and the like. Portable device 102 also includes at least a touch-screen driver 106 and an interface application 108 to initiate display of a user interface 110 and the various user interface elements, features, and controls.

In an embodiment of a touch pull-in gesture, a user of portable device 102 can initiate a touch input 112 with a finger just off an edge of the touch-screen 104 and then motion a pull-in gesture 114 in a direction 116 across the touch-screen. The motion of the touch pull-in gesture 114 is illustrated in the direction 116 as the hand moves from position 118, to position 120, and to position 122 (shown successively in the three views). When the motion of the touch pull-in gesture 114 is initiated by the user, a contact region 124 progressively expands, such as illustrated when the hand moves from the edge of the touch-screen at position 118 to position 120, and then from position 120 to position 122. The progressive expansion of the contact region 124 is then determined or recognized as the touch pull-in gesture 114.

The touch-screen driver 106 is implemented to detect the touch input 112 that starts at an edge of the touch-screen 104 and progresses as the expanding contact region 124 from the edge of the touch-screen toward approximately a center region 126 of the touch-screen while the touch input 112 remains in contact with the touch-screen. The touch-screen driver 106 can determine, or otherwise recognize that the expanding contact region 124 represents the touch pull-in gesture 114 and communicate gesture data that corresponds to the gesture to the interface application 108. The interface application 108 can receive the gesture data and then initiate a display of a user interface component. The expanding contact region 124 can be detected by the touch-screen driver 106 as a progression of motion as the touch input 112 remains in contact with the touch-screen. The touch pull-in gesture 114 is then recognized as a combination of the touch input 112 at the edge of the touch-screen and the motion gesture across the touch-screen which gives the appearance of dragging a user interface component onto the touch-screen for display.

In various implementations, the interface application 108 can initiate a display of a vertical scrollbar 128 as a user interface component when the touch pull-in gesture 114 starts at a side edge 130 of the touch-screen 104. Alternatively or in addition, the interface application 108 can initiate a display of a drop-down menu (not shown) as a user interface component when the touch pull-in gesture 114 starts at a top edge 132 of the touch-screen 104. Alternatively or in addition, the interface application 108 can initiate a display of a horizontal scrollbar (not shown), or other user interface component, when the touch pull-in gesture 114 starts at a bottom edge 134 of the touch-screen 104.

In the various implementations, the interface application 108 can initiate a display of the user interface component proximate a location of the touch pull-in gesture on the touch-screen. The vertical scrollbar, drop-down menu, and horizontal scrollbar are merely examples for discussion purposes. In various implementations, any type of user interface component can be initiated for display at a location proximate a touch pull-in gesture on the touch-screen. A user interface component can include any type of hidden menu, slide menu, drop-down menu, scrollbar, image, graphic, text, user-selectable control, menu selection, map element, and/or any other type of user interface displayable feature or item.

The direction in which the contact region 124 expands (e.g., direction 116 in this example) correlates to the direction of the touch pull-in gesture 114. In an implementation, the touch-screen driver 106 can detect the touch pull-in gesture 114 from discernable variables, such as a direction variable {right-to-left}; start region position variables {left1, top1, right1, bottom1}; end region position variables {left2, top2, right2, bottom2}; and a motion rate variable {x number of pixels per second}.

It should be noted that the representation of the touch input 112, the indication of direction 116, and the representations of the contact region 124 are merely illustrative for discussion purposes. When embodiments of a touch pull-in gesture are implemented, the various representations and indications may or may not appear on the touch-screen and/or on a user interface.

Figure 2:
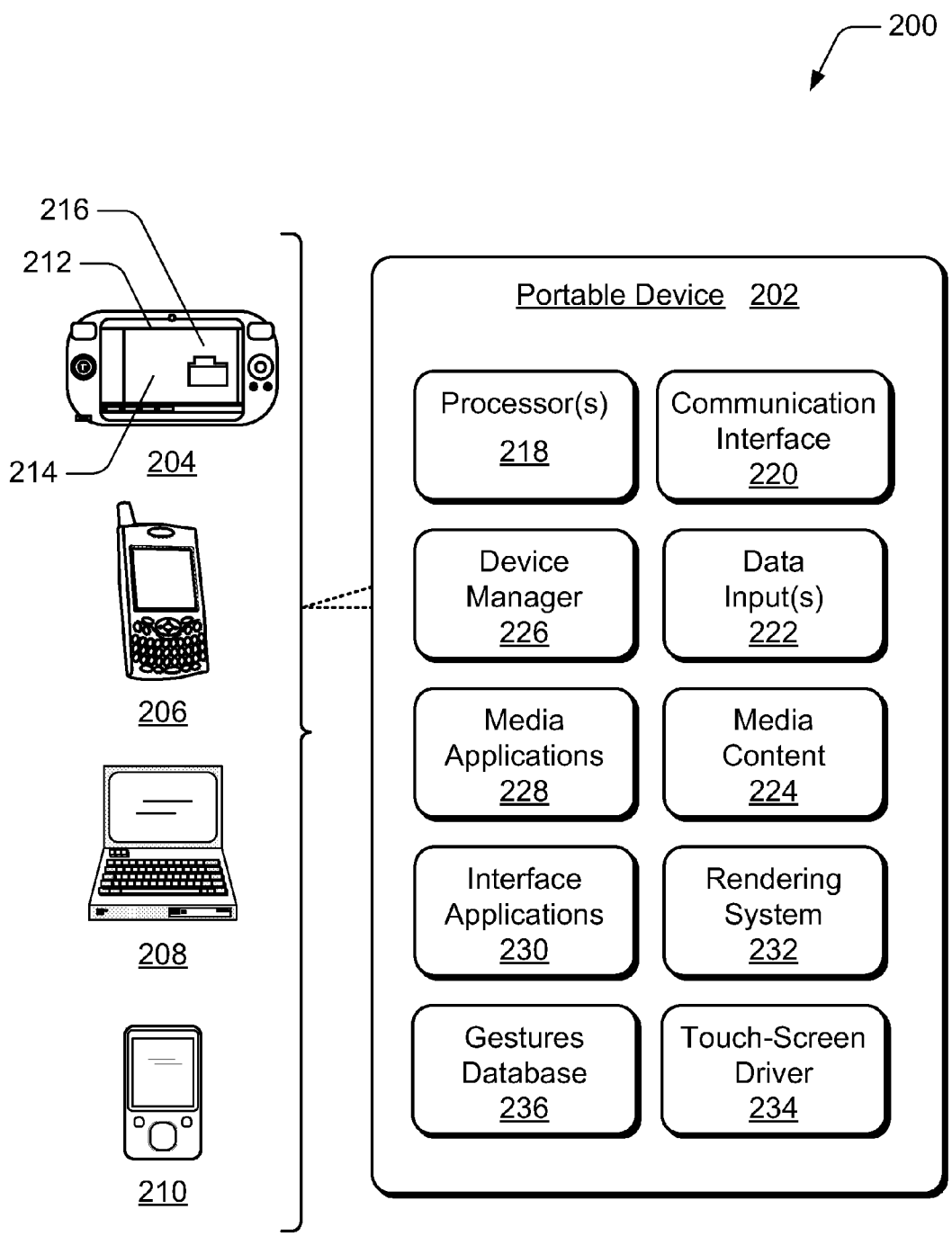
FIG. 2 illustrates an example system in which embodiments of a touch pull-in gesture can be implemented.

FIG. 2 illustrates an example system 200 in which various embodiments of a touch pull-in gesture can be implemented. Example system 200 includes a portable device 202 (e.g., a wired and/or wireless device) that can be any one or combination of a mobile personal computer 204, a personal digital assistant (PDA), a mobile phone 206 (e.g., cellular, VoIP, WiFi, etc.) that is implemented for data, messaging, and/or voice communications, a portable computer device 208 (e.g., a laptop computer, a laptop computer with a touch-screen, etc.), a media device 210 (e.g., a personal media player, portable media player, etc.), a gaming device, an appliance device, an electronic device, and/or any other type of portable device that can receive, display, and/or communicate data in any form of audio, video, and/or image data.

Each of the various portable devices can include an integrated display and/or an integrated touch-screen, as well as selectable input controls via which a user can input data and/or selections. For example, mobile personal computer 204 includes an integrated touch-screen 212 on which a user interface 214 can be displayed that includes displayable objects and/or user interface elements 216, such as any type of image, graphic, text, selectable button, user-selectable control, menu selection, map element, and/or any other type of user interface displayable feature or item.

Any of the various portable devices described herein can be implemented with one or more sensors, processors, communication components, data inputs, memory components, storage media, processing and control circuits, and/or a content rendering system. Any of the portable devices can also be implemented for communication via communication networks that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 4. A portable device may also be associated with a user (i.e., a person) and/or an entity that operates the device such that a portable device describes logical devices that include users, software, and/or a combination of devices.

In this example, portable device 202 includes one or more processors 218 (e.g., any of microprocessors, controllers, and the like), a communication interface 220 for data, messaging, and/or voice communications, and data inputs 222 to receive media content 224. Media content (e.g., to include recorded media content) can include any type of audio, video, and/or image data received from any media content or data source, such as messages, television media content, music, video clips, data feeds, interactive games, network-based applications, and any other content. Portable device 202 is implemented with a device manager 226 that includes any one or combination of a control application, software application, signal processing and control module, code that is native to the particular device, and/or a hardware abstraction layer for the particular device.

Portable device 202 includes various media applications 228 that may incorporate components such as interface applications 230 that can be processed or otherwise executed by the processors 218. The media applications 228 can include a music and/or video player, a Web browser, an email application, and the like. Portable device 202 includes a rendering system 232 to render user interfaces from the interface applications 230 to generate a display on any of the portable devices. The rendering system 232 is also implemented to receive and render any form of audio, video, and/or image data received from any media content and/or data source.

Portable device 202 also includes a touch-screen driver 234 and a gestures database 236 that includes various determinable representations of gestures, inputs, and/or motions that an interface application 230 is configured to determine or recognize, such as a touch pull-in gesture. Implementations of an interface application 230 and the touch-screen driver 234 are described with reference to the interface application 108 and touch-screen driver 106 shown in FIG. 1, and with reference to embodiments of a touch pull-in gesture as described herein.

Example method 300 is described with reference to FIG. 3 in accordance with one or more embodiments of a touch pull-in gesture. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example methods may be described in the general context of computer-executable instructions, which can include software, applications, routines, programs, objects, components, data structures, procedures, modules, functions, and the like.

The methods may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
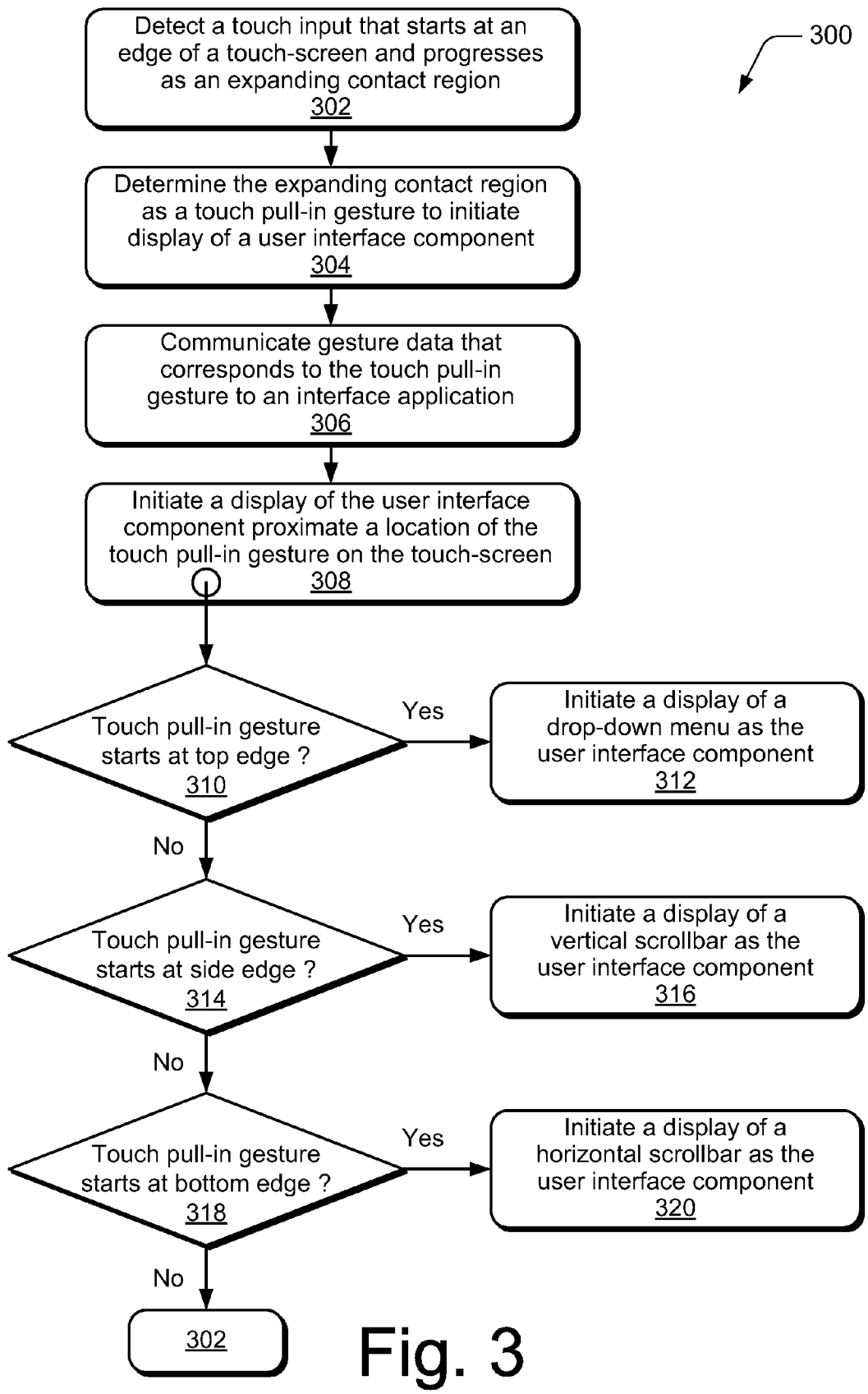
FIG. 3 illustrates example method(s) for a touch pull-in gesture in accordance with one or more embodiments.

FIG. 3 illustrates example method(s) 300 of a touch pull-in gesture. The order in which the method is described is not intended to be construed as a limitation, and any number of the described method blocks can be combined in any order to implement the method, or an alternate method.

At block 302, a touch input is detected that starts at an edge of a touch-screen and progresses as an expanding contact region. For example, the touch-screen driver 106 at portable device 102 detects the touch input 112 that starts at an edge 130 of the touch-screen 104 and progresses as the expanding contact region 124 from the edge of the touch-screen toward approximately a center region 126 of the touch-screen while the touch input 112 remains in contact with the touch-screen. The touch-screen driver 106 detects the expanding contact region 124 as a progression of motion as the touch input 112 remains in contact with the touch-screen, and the touch pull-in gesture 114 is then recognized as a combination of the touch input 112 at the edge of the touch-screen and the motion gesture.

At block 304, the expanding contact region is determined as a touch pull-in gesture to initiate a display of a user interface component. For example, the touch-screen driver 106 at portable device 102 determines, or otherwise recognizes, the expanding contact region 124 as the touch pull-in gesture 114. At block 306, gesture data that corresponds to the touch pull-in gesture is communicated to an interface application. For example, the touch-screen driver 106 at portable device 102 communicates or otherwise broadcasts gesture data that corresponds to the touch pull-in gesture 114 to the interface application 108. The gesture data can be communicated in the form of a system broadcast message that includes various information about the gesture, such as the location where the gesture is initiated, the speed or rate of the gesture, and/or the touch pressure (e.g., if the system supports a touch pressure measurement or value).

At block 308, a display of the user interface component is initiated proximate a location of the touch pull-in gesture on the touch-screen. For example, the interface application 108 at portable device 102 initiates a display of the user interface component proximate the location of the touch pull-in gesture 114 on the touch-screen 104 which gives the appearance of dragging the user interface component onto the touch-screen for display. Various optional examples of a user interface component that is initiated for display at block 308 are described with reference to blocks 310-320.

At block 310, a determination is made as to whether the touch pull-in gesture starts at a top edge of the touch-screen. If the touch pull-in gesture starts at the top edge 132 of the touch-screen 104 (i.e., "yes" from block 310), then at block 312, a drop-down menu is initiated for display as the user interface component. If the touch pull-in gesture does not start at the top edge of the touch-screen (i.e., "no" from block 310), then at block 314, a determination is made as to whether the touch pull-in gesture starts at a side edge of the touch-screen.

If the touch pull-in gesture starts at the side edge 130 of the touch-screen 104 (i.e., "yes" from block 314), then at block 316, a vertical scrollbar 128 is initiated for display as the user interface component. If the touch pull-in gesture does not start at the side edge of the touch-screen (i.e., "no" from block 314), then at block 318, a determination is made as to whether the touch pull-in gesture starts at a bottom edge of the touch-screen.

If the touch pull-in gesture starts at the bottom edge 134 of the touch-screen 104 (i.e., "yes" from block 318), then at block 320, a horizontal scrollbar is initiated for display as the user interface component. If the touch pull-in gesture does not start at the bottom edge of the touch-screen (i.e., "no" from block 318), then the method can continue at block 302 to detect a touch input. The method can also continue at block 302 from blocks 312, 316, and/or 320 to detect a touch input. The display of a drop-down menu (at block 312), a vertical scrollbar (at block 316), or a horizontal scrollbar (at block 320) are merely examples of various user interface components. In other implementations, any type of user interface component can be initiated for display at a location proximate a touch pull-in gesture on the touch-screen.

Figure 4:
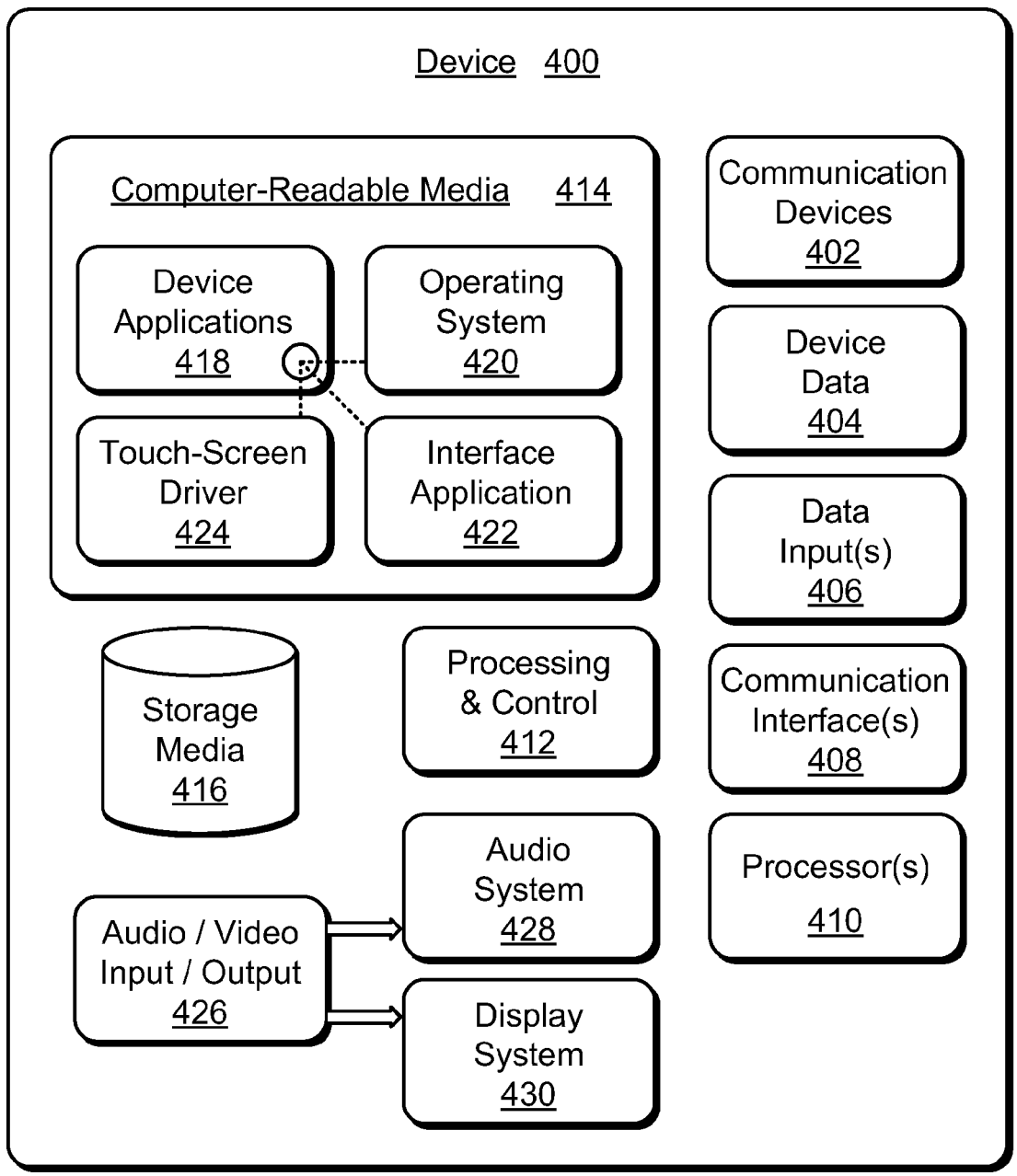
FIG. 4 illustrates various components of an example device that can implement embodiments of a touch pull-in gesture.

FIG. 4 illustrates various components of an example device 400 that can be implemented as any type of portable and/or computer device as described with reference to FIGS. 1 and 2 to implement embodiments of a touch pull-in gesture. Device 400 includes communication devices 402 that enable wired and/or wireless communication of device data 404 (e.g., received data, data that is being received, data scheduled for broadcast, data packets of the data, etc.). The device data 404 or other device content can include configuration settings of the device, media content stored on the device, and/or information associated with a user of the device. Media content stored on device 400 can include any type of audio, video, and/or image data. Device 400 includes one or more data inputs 406 via which any type of data, media content, and/or inputs can be received, such as user-selectable inputs, messages, music, television media content, recorded video content, and any other type of audio, video, and/or image data received from any content and/or data source.

Device 400 also includes communication interfaces 408 that can be implemented as any one or more of a serial and/or parallel interface, a wireless interface, any type of network interface, a modem, and as any other type of communication interface. The communication interfaces 408 provide a connection and/or communication links between device 400 and a communication network by which other electronic, computing, and communication devices communicate data with device 400.

Device 400 includes one or more processors 410 (e.g., any of microprocessors, controllers, and the like) which process various computer-executable instructions to control the operation of device 400 and to implement embodiments of a touch pull-in gesture. Alternatively or in addition, device 400 can be implemented with any one or combination of hardware, firmware, or fixed logic circuitry that is implemented in connection with processing and control circuits which are generally identified at 412. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 400 also includes computer-readable media 414, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 400 can also include a mass storage media device 416.

Computer-readable media 414 provides data storage mechanisms to store the device data 404, as well as various device applications 418 and any other types of information and/or data related to operational aspects of device 400. For example, an operating system 420 can be maintained as a computer application with the computer-readable media 414 and executed on processors 410. The device applications 418 can include a device manager (e.g., a control application, software application, signal processing and control module, code that is native to a particular device, a hardware abstraction layer for a particular device, etc.). The device applications 418 also include any system components or modules to implement embodiments of a touch pull-in gesture. In this example, the device applications 418 include an interface application 422 and a touch-screen driver 424 that are shown as software modules and/or computer applications. Alternatively or in addition, the interface application 422 and the touch-screen driver 424 can be implemented as hardware, software, firmware, or any combination thereof.

Device 400 also includes an audio and/or video input-output system 426 that provides audio data to an audio system 428 and/or provides video data to a display system 430. The audio system 428 and/or the display system 430 can include any devices that process, display, and/or otherwise render audio, video, and image data. Video signals and audio signals can be communicated from device 400 to an audio device and/or to a display device via an RF (radio frequency) link, S-video link, composite video link, component video link, DVI (digital video interface), analog audio connection, or other similar communication link. In an embodiment, the audio system 428 and/or the display system 430 are implemented as external components to device 400. Alternatively, the audio system 428 and/or the display system 430 are implemented as integrated components of example device 400.

Although embodiments of a touch pull-in gesture have been described in language specific to features and/or methods, it is to be understood that the subject of the appended claims is not necessarily limited to the specific features or methods described. Rather, the specific features and methods are disclosed as example implementations of a touch pull-in gesture.

The invention claimed is:

1. A method implemented by a portable computer device, the method comprising:
    detecting a touch input that from a position at least partially off of a touch-screen, crosses over an edge of the touch-screen, and progresses as an expanding contact region from the edge of the touch-screen toward approximately a center region of the touch-screen while the touch input remains in contact with the touch-screen;
    determining the expanding contact region as a touch pull-in gesture to initiate a display of a user interface component based on a direction variable, a start region position variable, and a motion rate variable for which data is ascertained from the detected touch input; and
    initiating a display of the user interface component at a location of the touch pull-in gesture where detected as the touch input on the touch-screen, the touch pull-in gesture giving the appearance that the user interface component is dragged onto the touch-screen in a direction of the touch-pull in gesture.

2. A method as recited in claim 1, wherein the touch pull-in gesture is recognized as a combination of the touch input at the edge of the touch-screen and a motion gesture across the touch-screen.

3. A method as recited in claim 1, further comprising initiating a display of a drop-down menu as the user interface component when the touch pull-in gesture crosses over a top edge of the touch-screen.

4. A method as recited in claim 1, further comprising initiating a display of a vertical scrollbar as the user interface component when the touch pull-in gesture crosses over a side edge of the touch-screen.

5. A method as recited in claim 1, further comprising initiating a display of a hidden menu as the user interface component at the location of the touch pull-in gesture on the touch-screen.

6. A method as recited in claim 5, wherein the touch pull-in gesture gives the appearance of dragging the hidden menu onto the touch-screen for display in the direction of the touch pull-in gesture.

7. A method as recited in claim 1, wherein the expanding contact region is detected as a progression of motion as the touch input remains in contact with the touch-screen.

8. A method as recited in claim 1, further comprising:
    displaying a drop-down menu as the user interface component when the touch pull-in gesture crosses over a top edge of the touch-screen;
    displaying a vertical scroll bar as the user interface component when the touch pull-in gesture crosses over a side edge of the touch-screen; and
    displaying a horizontal scroll bar as the user interface component when the touch pull-in gesture crosses over a bottom edge of the touch-screen.

9. A portable computer device, comprising:
    at least a memory and a processor configured to implement a touch pull-in gesture that gives the appearance of dragging a user interface component onto a touch-screen for display, the user interface component appearing to be dragged onto the touch-screen in a direction that the touch pull-in gesture is performed;
    a touch-screen driver configured to detect a touch input that crosses onto a side edge of the touch-screen from a position outside of the touch-screen and progresses as an expanding contact region from the side edge of the touch-screen toward approximately a center region of the touch-screen while the touch input remains in contact with the touch-screen; and
    an interface application configured to receive gesture data that corresponds to the touch pull-in gesture from the touch-screen driver and determine the expanding contact region as the touch pull-in gesture to initiate a display of the user interface component at a location of the touch pull-in gesture on the touch-screen, wherein the gesture data received by the interface application is used to determine the expanded contact region as the touch pull-in gesture and includes data representative of at least a direction variable, a start region position variable, and a motion rate variable.

10. A portable computer device as recited in claim 9, wherein the touch pull-in gesture is recognized as a combination of the touch input at the side edge of the touch-screen and a motion gesture across the touch-screen.

11. A portable computer device as recited in claim 9, wherein the touch-screen driver is further configured to detect the expanding contact region as a progression of motion as the touch input remains in contact with the touch-screen.

12. A portable computer device as recited in claim 9, wherein the interface application is further configured to initiate a display of a drop-down menu as the user interface component when the touch pull-in gesture crosses onto the side edge of the touch-screen.

13. A portable computer device as recited in claim 9, wherein the interface application is further configured to initiate a display of a vertical scrollbar as the user interface component when the touch pull-in gesture crosses onto the side edge of the touch-screen.

14. A portable computer device as recited in claim 9, wherein the interface application is further configured to initiate a display of a hidden menu as the user interface component when the touch pull-in gesture is determined.

15. Computer-readable memory devices having stored thereon instructions that are executable by a portable computer device to perform rising:

detecting a touch input that starts at least partially off of a touch-screen, crosses over an edge of the touch-screen, and progresses as an expanding contact region from the edge of the touch-screen and across the touch-screen while the touch input remains in contact with the touch-screen;

determining the expanding contact region as a touch pull-in gesture using a combination of a direction variable, a start region position variable, and a motion rate variable and for which data is ascertained from the detected touch input; and initiating a display of a user interface component at a location of the touch pull-in gesture where detected as the touch input on the touch-screen, the touch pull-in gesture giving the appearance that the user interface component is dragged onto the touch screen, the user interface component appearing to be dragged from the edge of the touch-screen over which the touch input crosses and toward a center of the touch-screen.

16. Computer-readable memory devices as recited in claim 15, wherein the operations further comprise recognizing the touch pull-in gesture as a combination of the touch input at the edge of the touch-screen and a motion gesture across the touch-screen.

17. Computer-readable memory devices as recited in claim 15, wherein the operations further comprise initiating a display of a drop-down menu as the user interface component when the touch pull-in gesture crosses over a top edge of the touch-screen.

18. Computer-readable memory devices as recited in claim 15, wherein the operations further comprise initiating a display of a vertical scrollbar as the user interface component when the touch pull-in gesture crosses over a side edge of the touch-screen.

19. Computer-readable memory devices as recited in claim 15, wherein the operations further comprise initiating a display of a hidden menu as the user interface component that gives the appearance of dragging the hidden menu onto the touch-screen for display.

20. Computer-readable memory devices as recited in claim 15, wherein the operations further comprise detecting the expanding contact region as a progression of motion as the touch input remains in contact with the touch-screen.

\* \* \* \* \*